(12) United States Patent
Chen

US012266173B2

(10) Patent No.: US 12,266,173 B2
(45) Date of Patent: Apr. 1, 2025

(54) IMAGE RECOGNITION METHOD, VIDEO PLAYBACK METHOD, RELATED DEVICES

(71) Applicant: TENCENT TECHNOLOGY (SHENZHEN) COMPANY LIMITED, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 387 days.

(21) Appl. No.: 17/708,419

(22) Filed: Mar. 30, 2022

(65) Prior Publication Data

US 2022/0270365 A1     Aug. 25, 2022

Related U.S. Application Data

(63) Continuation of application No. PCT/CN2021/085799, filed on Apr. 7, 2021.

(30) Foreign Application Priority Data

May 11, 2020   (CN) .......................... 202010390453.5

(51) Int. Cl.
*G06V 20/40* (2022.01)
*G06V 10/30* (2022.01)
*G06V 10/98* (2022.01)
*H04N 5/14* (2006.01)
(Continued)

(52) U.S. Cl.
CPC .............. *G06V 20/41* (2022.01); *G06V 10/98* (2022.01); *G06V 20/46* (2022.01)

(58) Field of Classification Search
CPC ........ G06V 10/98; G06V 20/41; G06V 20/46; H04N 19/137; H04N 19/14; H04N 19/142;
(Continued)

(56) References Cited

U.S. PATENT DOCUMENTS

| 5,907,824 | A | * | 5/1999 | Tzirkel-Hancock | .... G10L 15/08 704/E15.014 |
| 7,664,336 | B2 | | 2/2010 | Zhang et al. | |
| 2007/0074266 | A1 | * | 3/2007 | Raveendran | ......... H04N 19/172 725/94 |

FOREIGN PATENT DOCUMENTS

| CN | 103747270 A | 4/2014 |
| CN | 10983175 A * | 5/2019 |

(Continued)

OTHER PUBLICATIONS

Tian et al: "Some properties of submetrices in a solution to the matric equation AXB-C with applications", Journal of the Franklin Institute, Pergaon press, Elmsfor, NY, US, Aug. 1, 2009, pp. 557-569, XP026161896.*

(Continued)

*Primary Examiner* — Asghar H Bilgrami
(74) *Attorney, Agent, or Firm* — Crowell & Moring LLP

(57) ABSTRACT

The disclosure provides an image recognition method and apparatus. The image recognition method may include obtaining a first frame image of which a frame type is known, and a second frame image and a third frame image of which frame types are unknown from an image frame sequence. The method may further include predicting a pixel sequence of the second frame image according to the first frame image and the third frame image. The method may further include calculating a pixel error according to a second pixel sequence of the second frame image and the predicted pixel sequence. The second pixel sequence includes pixel values of the pixels in the second frame image. The method may further include recognizing a frame type of the second frame image or the third frame image according to the pixel error.

18 Claims, 14 Drawing Sheets

(51) Int. Cl.
  *H04N 7/01*      (2006.01)
  *H04N 19/137*    (2014.01)
  *H04N 19/14*     (2014.01)
  *H04N 19/142*    (2014.01)
  *H04N 19/577*    (2014.01)

(58) Field of Classification Search
  CPC ...... H04N 19/40; H04N 19/577; H04N 5/147; H04N 7/0115
  See application file for complete search history.

(56) References Cited

FOREIGN PATENT DOCUMENTS

| CN | 109803175 A | * | 5/2019 | |
| CN | 110392282 A | | 10/2019 | |
| CN | 111310744 A | | 6/2020 | |
| CN | 113630621 A | * | 11/2021 | ........... H04N 19/114 |
| WO | WO 99/51022 | * | 3/1998 | ....... G06F 17/30793 |
| WO | 1999051022 A1 | | 10/1999 | |
| WO | WO-9951022 A1 | * | 10/1999 | ....... G06F 17/30793 |
| WO | WO 2007/114995 A1 | | 10/2007 | |

OTHER PUBLICATIONS

English translation of International Search Report of PCT Application PCT/CN2021/085799 dated Jul. 15, 2021, 3 pages.

Abstract of Bere. Sachin S. "Duplicate video and object detection by video key frame using F-SIFT" (2018 Fourth International Conference on Computing Communication Control and Automation (ICCUBEA), Aug. 18, 2018 (Aug. 18, 2018), sections I-III.

Abstract of Kwon, Yong Hoon et al. "Predicting Future Frames using Retrospective Cycle GAN" {2019 IEEE/CVF Conference on Computer Vision and Pattern Recognition gCVPRz, Dec. 31, 2019 (Dec. 31, 2019), sections 1-3.

Fernando, W.A.C., "Sudden scene change detection in compressed video using interpolated macroblocks in B-frames", *Journal of Multimed Tools and Applications*, Springer Science + Business Media, LLC, 2006, v. 28, pp. 301-320, NL.

Karpathy, Andrej et al., "Large-scale Video Classification with Convolutional Neural Networks", Computer Science Department, *Stamford University*, 2014, 8p, US.

Lukarski, Dimitar, "Parallel Sparse Linear Algebra for Multi-core and Many-core Platforms", dissertation *Karlsruhe Institute of Technology*, Jan. 25, 2012, 124p, DE.

Tian, Yongge, "Some properties of submatrices in a solution to the matrix equation AXB=C with applications", *ScienceDirect*, Journal of the Franklin Institute, Elsevier, Apr. 29, 2008, pp. 557-569, CN.

Yang, Xin et al., "Near-Duplicate Detection for Images and Videos", Dept. of Electrical and Computer Engineering, *University of California*, Oct. 23, 2009, pp. 73-80, US.

Wikipedia, "Gaussian elimination", found on the internet at https://en.wikipedia.org/w/index.php?title=Gaussian_elimination&oldit=954486731, printed Aug. 12, 2022, 8p.

* cited by examiner

IMAGE RECOGNITION METHOD, VIDEO PLAYBACK METHOD, RELATED DEVICES

RELATED APPLICATION

This application a continuation application of PCT Patent Application No. PCT/CN2021/085799, filed on Apr. 7, 2021, which claims priority to Chinese Patent Application No. 202010390453.5, entitled "IMAGE RECOGNITION METHOD, VIDEO PLAYBACK METHOD, RELATED DEVICES AND MEDIUM", filed with the China Intellectual Property Administration on May 11, 2020, wherein the content of each of the above-referenced applications is incorporated herein by reference in its entirety.

FIELD OF THE TECHNOLOGY

This application relates to the field of Internet technologies and image processing technologies, and in particular, to image recognition and video playback.

BACKGROUND OF THE DISCLOSURE

A video refers to continuous pictures formed by sequentially playing image frames in a corresponding image frame sequence at a certain frame rate, which may be a television video, a screen recording video, a short video, and the like. During video production, overlapped or repeated frame images are usually generated in the image frame sequence of the video due to various factors. For example, for a television video, different video standards may cause different frame rates in the television video. For example, 60 frames are used in the China broadcasting television, 50 frames are used in the America television, and 24 frames are used in movies. For unified storage, a variable frame rate algorithm usually needs to be used, to convert frame rates of such television videos into a fixed value. For a television video with a relatively low frame rate, the principle of the common variable frame rate algorithm is as follows: duplicating a previous frame of image to obtain a repeated frame image, or overlapping two neighboring image frames to obtain an overlapped frame image, thereby improving the frame rate. It can be seen that an image frame sequence of a television video obtained by using the variable frame rate algorithm usually includes a lot of overlapped or repeated frame images. For a screen recording video, during screen recording, if a screen recording speed is greater than an image display speed, an image frame sequence of the screen recording video obtained through recording may include a lot of overlapped frame images.

SUMMARY

The embodiments of this disclosure provide an image recognition method, a video playback method, related devices, and a medium, which can effectively and accurately recognize a frame type of a frame image, thereby improving the accuracy and stability of frame type recognition.

According to one aspect, an embodiment of this disclosure provides an image recognition method. The image recognition method is performed by a server. The method may include obtaining a first frame image of which a frame type is known, and a second frame image and a third frame image of which frame types are unknown from an image frame sequence. The second frame image is located between the first frame image and the third frame image in the image frame sequence. The method may further include predicting a pixel sequence of the second frame image according to the first frame image and the third frame image. The predicted pixel sequence includes prediction values of pixels in the second frame image. The method may further include calculating a pixel error according to a second pixel sequence of the second frame image and the predicted pixel sequence. The second pixel sequence includes pixel values of the pixels in the second frame image. The method may further include recognizing a frame type of the second frame image or the third frame image according to the pixel error.

According to another aspect, an embodiment of this disclosure provides an image recognition apparatus. The apparatus may include a memory operable to store computer-readable instructions and a processor circuitry operable to read the computer-readable instructions. When executing the computer-readable instructions, the processor circuitry may be configured to obtain a first frame image of which a frame type is known, and a second frame image and a third frame image of which frame types are unknown from an image frame sequence. The second frame image is located between the first frame image and the third frame image in the image frame sequence. The processor circuitry may be further configured to predict a pixel sequence of the second frame image according to the first frame image and the third frame image. The predicted pixel sequence includes prediction values of pixels in the second frame image. The processor circuitry may be further configured to calculate a pixel error according to a second pixel sequence of the second frame image and the predicted pixel sequence. The second pixel sequence includes pixel values of the pixels in the second frame image. The processor circuitry may be further configured to recognize a frame type of the second frame image or the third frame image according to the pixel error.

According to yet another aspect, an embodiment of this disclosure provides a computer storage medium, storing a computer program, the computer program being used for performing the image recognition method according to the foregoing aspect.

A frame type of the first frame image in the embodiments of this disclosure is known, and the second frame image is located between the first frame image and the third frame image in the image frame sequence. During recognition of frame types of the second frame image and the third frame image, a predicted pixel sequence of the second frame image may be first obtained through prediction according to the first frame image and the third frame image. Pixel prediction is performed on the second frame image by using two image frames neighboring the second frame image, which can effectively improve the accuracy of the predicted pixel sequence. Next, a pixel error may be calculated according to an actual pixel sequence (a second pixel sequence) and the relatively accurate predicted pixel sequence of the second frame image, to effectively reduce an effect caused by coding noise, thereby improving the accuracy and stability of the pixel error. Then, a frame type of the second frame image or the third frame image may be recognized according to the relatively accurate pixel error, to improve the accuracy and stability of frame type recognition.

According to another aspect, an embodiment of this disclosure provides a video playback method. The video playback method is performed by a video processing device. The method may include obtaining an image frame sequence corresponding to a target video. The image frame sequence includes a plurality of image frames. The method may further include recognizing a frame type of each frame image in the image frame sequence, frame types of frame images other than the first frame image and the last frame image in the image frame sequence being recognized using the foregoing image recognition method. The frame type includes at least one of an effective frame, an overlapped frame, or a repeated frame. The effective frame is a non-repeated and non-overlapped frame in the image frame sequence. The method may further include filtering out frame images of which frame types are the overlapped frame and the repeated frame from the image frame sequence, and performing frame insertion and transcoding on the filtered image frame sequence, to obtain transcoded data. The method may further include playing back the target video according to the transcoded data in a playback interface.

According to another aspect, an embodiment of this disclosure provides a computer device, including:
- a processor, a communication interface, a memory, and a communication bus,
- the processor, the communication interface, and the memory communicating with each other by using the communication bus; the communication interface being an interface of a communication module;
- the memory being configured to store program code, and transmit the program code to the processor; and
- the processor being configured to call instructions of the program code in the memory to perform the foregoing video playback method.

According to yet another aspect, an embodiment of this disclosure provides a computer storage medium, storing a computer program, the computer program being used for performing the video playback method according to the foregoing aspect.

According to still another aspect, an embodiment of this disclosure provides a computer program product including instructions, when running on a computer, the computer program product causing the computer to perform the image recognition method or the video playback method according to the foregoing aspects.

In the embodiments of this disclosure, during video playback, an image frame sequence corresponding to a target video may be obtained in advance, and a frame type of each frame in the image frame sequence is recognized. The frame type herein includes an effective frame, an overlapped frame, or a repeated frame. Frame types of frame images other than the first frame image and the last frame image in the image frame sequence are recognized by using the foregoing image recognition method, which can effectively improve the accuracy and stability of frame type recognition. Then, frame images of which frame types are the overlapped frame and the repeated frame may be filtered out from the image frame sequence, and frame insertion and transcoding is performed on the filtered image frame sequence. In this way, an effective frame rate (that is, a quantity of frame images played every second) of the target video can be effectively improved, and when the target video is played according to the transcoded data, ghosting or tearing caused by overlapped frames and stuttering caused by repeated frame images can be reduced, thereby improving the playback effect of the target video.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

The following clearly and completely describes technical solutions in embodiments of this disclosure with reference to the accompanying drawings in the embodiments of this disclosure.

With the research and progress of artificial intelligence (AI) technology, computer vision (CV) has also received corresponding development and progress as an important research direction in the AI technology. The AI involves a theory, a method, a technology, and an application system that use a digital computer or a machine controlled by the digital computer to simulate, extend, and expand human intelligence, perceive an environment, obtain knowledge, and use knowledge to obtain an optimal result. The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Figure 1A:
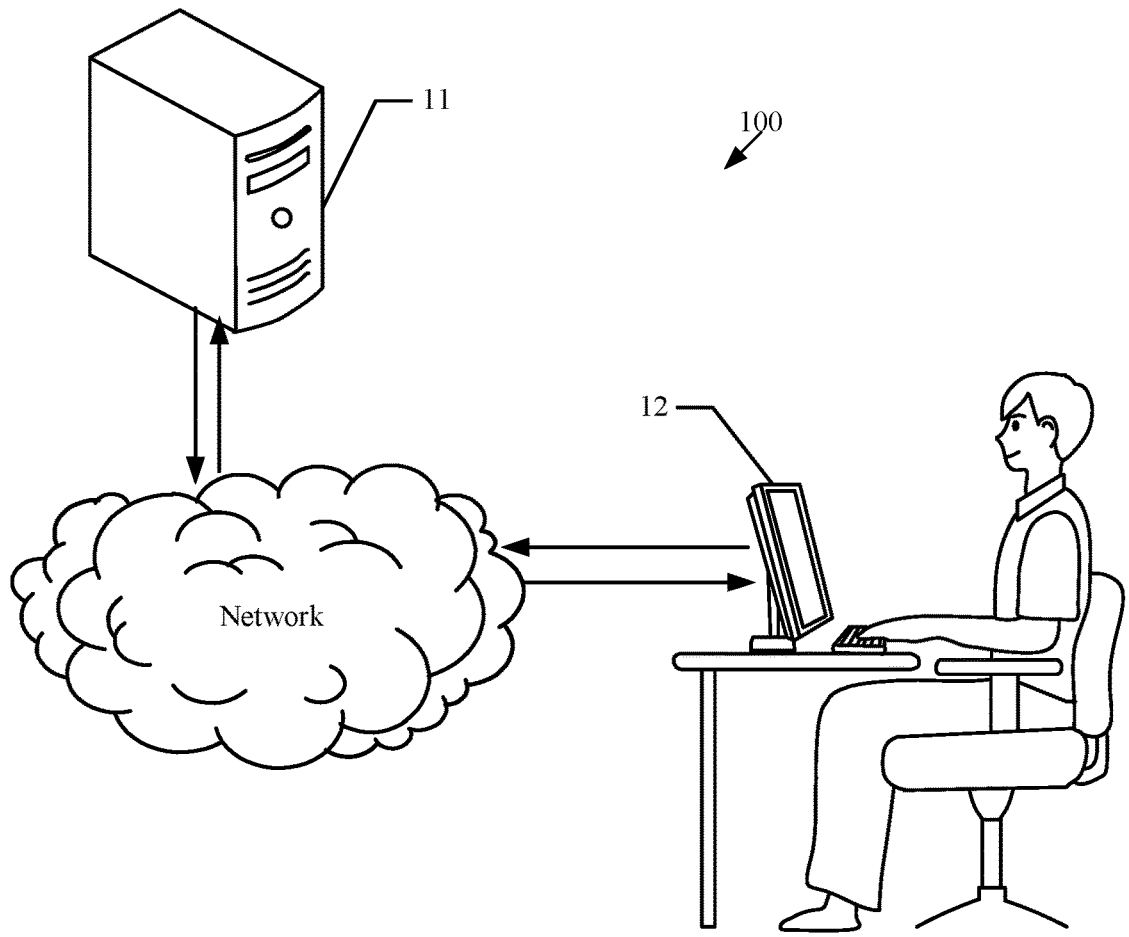
FIG. 1A is a schematic architecture diagram of a video processing system according to an embodiment of this disclosure.

The embodiments of this disclosure mainly relate to a video processing technology in computer vision technologies, and provide a video processing system based on the video processing technology. Referring to FIG. 1A, the video processing system 100 may include at least: a server 11 and a terminal device 12. The server 11 may be an independent physical server, or may be a server cluster formed by a plurality of physical servers or a distribute system, or may be a cloud server providing basic cloud computing services such as cloud services, a cloud database, cloud computing, a cloud function, cloud storage, network services, cloud communication, domain name services, security services, content delivery network (CDN), big data and AI platforms. The terminal device 12 is a terminal capable of playing back videos, and may be a playback device with a high frame rate and having a video playback function. The playback device with a high frame rate herein may include but is not limited to: a smart television, a smart phone, a tablet computer, a laptop computer, a desktop computer, and the like. Clients such as a video client, a browser client, an instant messaging client, an education client, and the like may run in the terminal device 12. It is to be understood that, FIG. 1A is only an exemplary representation of the architecture of the video processing system, and does not limit the specific architecture of the video processing system nor quantities of the terminal device 12 and the server 11.

Figure 1B:
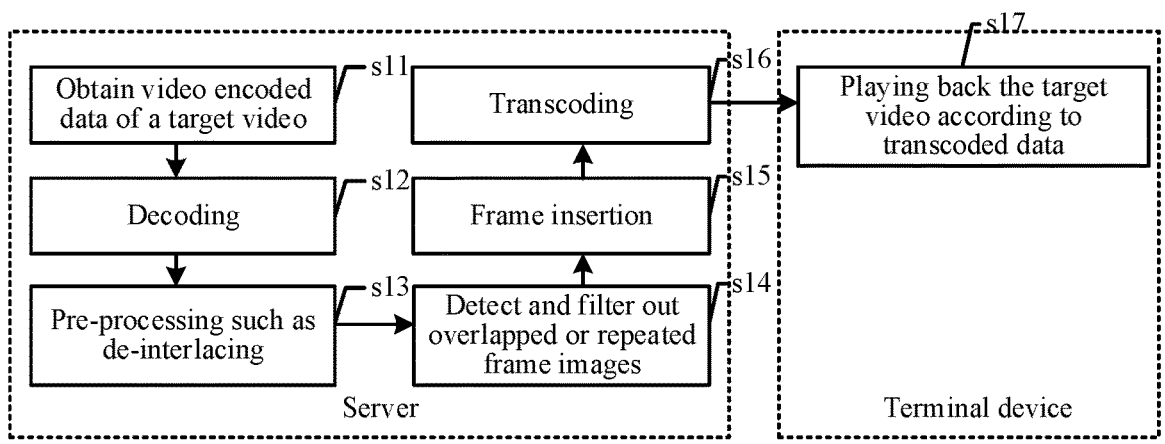
FIG. 1B is a schematic diagram of a video processing process according to an embodiment of this disclosure.

For the video processing process performed based on the foregoing video processing system, reference may be made to FIG. 1B, and a general process is as follows: First, the server 11 may obtain video encoded data of a target video through s11, and decode the video encoded data through s12, to obtain a decoded result. Next, the server 11 may perform pre-processing such as de-interlacing on the decoded result through s13, to obtain an image frame sequence of the target video. The de-interlacing herein may also be referred to as de-interleaving and specifically refers to a method of converting an interlaced (interlace scanning) image signal into a progressive form (progressive scanning) image signal. Then, the server 11 may detect and filter out overlapped and repeated frame images in the image frame sequence in s14, and perform frame insertion on the filtered image frame sequence through a frame insertion algorithm in s15. The frame insertion algorithm herein refers to an algorithm for inserting a new frame image between any two adjacent image frames in the image frame sequence to improve the watching experience of the video. The principle of the algorithm is mainly to generate a new frame image by analyzing the motion mode of the same object in two adjacent image frames, so that a motion track of each object in the new frame image are the same as the motion track of the object in the previous and next two image frames. Then, the server 12 may transcode the image frame sequence after frame insertion through s16, to obtain transcoded data, and deliver the transcoded data to the terminal device 12, so that the terminal device 12 invokes an internal client to play back the target video according to the transcoded data in s17. It is to be understood that FIG. 1B is only an exemplary representation of a general video processing process, and does not limit a specific video processing process. For example, in the actual video processing process, s13 may not be performed, that is, after the decoded result is obtained in s12, the decoded result may be directly used as the image frame sequence, and s14 to s16 are performed. In another example, in the actual video processing process, the server 11 may alternatively deliver the video encoded data of the target video to the terminal device 12, and the terminal device 12 invokes an internal client to obtain the transcoded data through s12 to s16, and directly plays back the target video according to the transcoded data.

Practice shows that the frame insertion algorithm used in the above video processing process usually has the following two requirements for the image frame sequence to be inserted:

(1) It is required that there is no duplication between two adjacent image frames in the image frame sequence: if any adjacent two image frames in the image frame sequence are duplicated (that is, the same), when a new frame image is inserted between the two image frames by using the frame insertion algorithm, the new frame image will be exactly the same as the previous and next two image frames. This will result in a period of still picture when the two image frames and the new frame image are displayed. It can be seen that, if there are duplicate frame images in the image frame sequence, when frame insertion and transcoding is performed on the image frame sequence and the target video is played according to the transcoded data, the picture between repeated frame images is still and the picture between non-repeated frame images moves, which makes the playing picture of the target video jam and affects the watching experience of the picture.

(2) It is required that two adjacent image frames in the image frame sequence do not overlap: usually, the correspondence of the same object between two adjacent image frames may be correctly analyzed only in a coherent video, so as to analyze the motion mode of the same object according to the correspondence. If a frame of image in the image frame sequence overlaps with other image frames, the frame insertion algorithm will work abnormally. In the light case, the new frame image generated by the frame insertion algorithm will be torn, and in the heavy case, the new frame image generated by the frame insertion algorithm will be seriously ghosted (that is, the white glare in the image).

From the above two requirements, in order to improve the practicability of the frame insertion algorithm, overlapped and repeated frame images in the image frame sequence need to be accurately recognized and deleted, to ensure that every frame of image inputted into the frame insertion algorithm meets the requirements, so that the frame insertion algorithm can work normally, thereby improving the transcoding and playing effect of the target video. Based on this, in the embodiments of this disclosure, an image recognition scheme is integrated in s14 of the above video processing process, so as to effectively and accurately recognize a frame type of each frame of image in the image frame sequence, and further determine and delete overlapped and repeated frame images according to the frame type of each frame of image. The frame type herein may include: an effective frame, a repeated frame, or an overlapped frame. The effective frame is a non-repeated and non-overlapped frame in the image frame sequence, the repeated frame is a frame with the same picture as a previous frame in the image frame sequence, and the overlapped frame is a frame obtained by performing weighted overlapping on several adjacent image frames in the image frame sequence according to a certain ratio.

During specific implementation, the general principle of the image recognition scheme is: for three image frames arranged in time sequence in the image frame sequence, where a frame type of the first frame image is an effective frame, and frame types of the last two image frames are unknown, predicting pixel values of the middle frame image by using the previous and next image frames, to obtain a predicted pixel sequence including prediction values of a plurality of pixels; and then, recognizing the frame types of the last two image frames according to a pixel error between the predicted pixel sequence and an actual pixel sequence of the middle frame image (that is, a sequence formed by actual pixel values of pixels in the middle frame image). It is to be understood that in the image recognition scheme provided in the embodiments of this disclosure, in a case of considering that an overlapped frame is usually mixed by the previous and next image frames, three image frames are selected at a time and the last two image frames are used to predict the predicted pixel sequence of the middle frame image. If it is found in actual processing that the overlapped frame is obtained by mixing three frames or even more image frames, during each frame type recognition, three frames or even more image frames may be used to predict a predicted pixel sequence of a frame image x of unknown frame type, and frame type recognition is performed according to a pixel error between the predicted pixel sequence and an actual pixel sequence of the frame image x.

Figure 2:
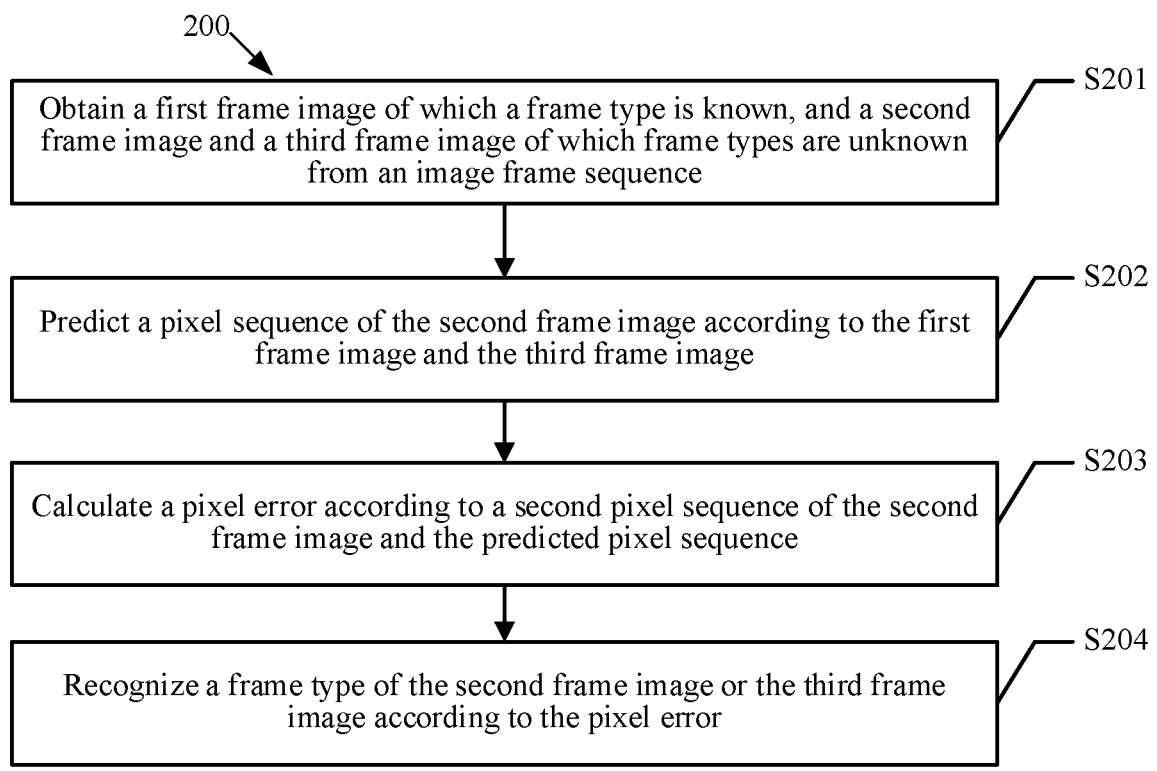
FIG. 2 is a schematic flowchart of an image recognition method according to an embodiment of this disclosure.

Based on the related description of the foregoing image recognition scheme, an embodiment of this disclosure provides an image recognition method 200 as shown in FIG. 2. The image recognition method 200 may be performed by using a server in the foregoing video processing system. Referring to FIG. 2, the image recognition method 200 may include the following S201 to S204.

S201. Obtain a first frame image of which a frame type is known, and a second frame image and a third frame image of which frame types are unknown from an image frame sequence.

In the embodiments of this disclosure, image frames in the image frame sequence are arranged in time sequence. A frame image with the first arrangement position in the image frame sequence is referred to as the first frame image. In the process of image recognition, a frame type of the first frame image (that is, the 1st frame image) in the image frame sequence may be defaulted as an effective frame, and frame images of unknown frame type can be obtained sequentially from the image frame sequence according to the arrangement order for frame type recognition. Based on this, the first frame image mentioned in this embodiment of this disclosure refers to a frame image with the latest recognition time among frame images of which frame types are effective frames in the image frame sequence, that is, the first frame image refers to the latest recognized frame image of which the frame type is an effective frame in the image frame sequence. The second frame image and the third frame image refer to two frame images whose arrangement positions are closest to the arrangement position of the first frame image among frame images of unknown frame type which are located behind the first frame image in the image frame sequence. In addition, the second frame image is located between the first frame image and the third frame image in the image frame sequence. That is, the second frame image is located behind the first frame image, and is located before the third frame image.

For example, it is assumed that before S201 is performed, frame types of frame images in the image frame sequence are, in sequence, the 1st frame image (the effective frame), the 2nd frame image (the repeated frame), the 3rd frame image (the effective frame), the 4th frame image (the repeated frame), the 5th frame image (unknown), the 6th frame image (unknown), the 7th frame image (unknown), . . . , and the last frame image (unknown). Then, the first frame image may be the 3rd frame image in the image frame sequence, the second frame image may be the 5th frame image in the image frame sequence, and the third frame image may be the 6th frame image in the image frame sequence. In another example, it is assumed that before S201 is performed, frame types of frame images in the image frame sequence are, in sequence, the 1st frame image (the effective frame), the 2nd frame image (the effective frame), the 3rd frame image (unknown), the 4th frame image (the repeated frame), the 5th frame image (unknown), the 6th frame image (unknown), the 7th frame image (unknown), . . . , and the last frame image (unknown). Then, the first frame image may be the 2nd frame image in the image frame sequence, the second frame image may be the 3rd frame image in the image frame sequence, and the third frame image may be the 5th frame image in the image frame sequence. In another example, it is assumed that before S201 is performed, frame types of frame images in the image frame sequence are, in sequence, the 1st frame image (the effective frame), the 2nd frame image (unknown), the 3rd frame image (unknown), the 4th frame image (unknown), . . . , and the last frame image (unknown). Then, the first frame image may be the 1st frame image in the image frame sequence, the second frame image may be the 2nd frame image in the image frame sequence, and the third frame image may be the 3rd frame image in the image frame sequence.

S202. Obtain a predicted pixel sequence of the second frame image through prediction according to the first frame image and the third frame image, the predicted pixel sequence including prediction values of pixels in the second frame image.

It can be known from the above that the second frame image is located between the first frame image and the third frame image in the image frame sequence. When the second frame image is an overlapped frame image, the second frame image is usually obtained by performing weighted overlapping on the first frame image and the third frame image according to a certain ratio. When the second frame image is a repeated frame image, the second frame image is usually obtained by duplicating the first frame image. When the third frame image is a repeated frame image, the third frame image is usually obtained by duplicating the second frame image. It can be seen that when the second frame image is the repeated or overlapped frame image, or the third frame image is the repeated frame image, pixel differences between the first frame image and the second frame image and between the second frame image and the third frame image are generally small. Based on this, in the embodiments of this disclosure, a predicted pixel sequence of the second frame image may be predicted according to the first frame image and the third frame image, and then, a frame type of the second frame image or a frame type of the third frame image is recognized according to a difference between the predicted pixel sequence and an actual pixel sequence of the second frame image.

During specific implementation, a first pixel sequence may be first constructed by using pixel values of pixels in the first frame image, and a third pixel sequence is constructed by using pixel values of pixels in the third frame image. Then, a first overlapping ratio between the second frame image and the first frame image and a second overlapping ratio between the second frame image and the third frame image may be obtained. In an implementation, a second pixel sequence may be constructed by using the pixels in the second frame image, and then, the first overlapping ratio and the second overlapping ratio are obtained through estimation by using a fitting algorithm (such as, a least square algorithm) according to the first pixel sequence, the second pixel sequence, and the third pixel sequence. The least square algorithm herein is an algorithm to find the best-fitting function of data by minimizing the sum of squares of errors. The first overlapping ratio and the second overlapping ratio may be estimated accurately by using the least square algorithm, and the sum of squares of the first overlapping ratio and the second overlapping ratio that are estimated and the actual ratio is minimized. In yet another implementation, a ratio of a quantity of identical pixels between two image frames and a total quantity of pixels included in a single frame of image may be used as an overlapping ratio between the two image frames. Specifically, a first ratio of a quantity of identical pixels between the second frame image and the first frame image and a total quantity of pixels included in the second frame image (or the first frame image) may be calculated, and the calculated first ratio is used as a first overlapping ratio between the second frame image and the first frame image. Similarly, a second ratio of a quantity of identical pixels between the second frame image and the third frame image and a total quantity of pixels included in the second frame image (or the third frame image) may also be calculated, and the calculated second ratio is used as a second overlapping ratio between the second frame image and the third frame image. After the first overlapping ratio and the second overlapping ratio are obtained, weighted summation may be performed on the first pixel sequence and the third pixel sequence by using the first overlapping ratio and the second overlapping ratio, to obtain the predicted pixel sequence of the second frame image.

S203. Calculate a pixel error according to a second pixel sequence and the predicted pixel sequence of the second frame image.

The second pixel sequence herein refers to an actual pixel sequence of the second frame image, and includes pixel values of the pixels in the second frame image. During specific implementation, differences between the pixel values and the prediction values of the pixels in the second frame image may be calculated respectively according to the second pixel sequence and the predicted pixel sequence. Then, a pixel error is calculated according to the differences between the pixel values and the prediction values of the pixels. The pixel error herein includes at least one of the following: a mean error, a mean squared error, and a maximum error. The mean error refers to a pixel error calculated according to a difference between a pixel value and a prediction value of each pixel in the second frame image. The mean squared error refers to a pixel error calculated according to a square of the difference between the pixel value and the prediction value of each pixel in the second frame image. The maximum error refers to a pixel error calculated according to an absolute value of a difference between a pixel value and a prediction value of a target pixel in the second frame image. The target pixel herein refers to a pixel having a maximum absolute value of a difference between a pixel value and a prediction value in the second frame image.

S204. Recognize a frame type of the second frame image or the third frame image according to the pixel error.

In the embodiments of this disclosure, the frame type may include any one of the following: an effective frame, an overlapped frame, or a repeated frame. It can be known from the above that the pixel error may include at least one of the following: a mean error, a mean squared error, and a maximum error. Practice shows that if the mean error is greater than an error threshold, or the mean squared error is greater than a first threshold, it may be indicated that the overall difference among the first frame image, the second frame image, and the third frame image is relatively large. In this case, the frame type of the second frame image may be directly determined as the effective frame. If the mean error is less than or equal to the error threshold, or the mean squared error is less than or equal to a second threshold, it may be indicated that the overall difference among the first frame image, the second frame image, and the third frame image is relatively small. However, the reasons for the small overall difference may include the following: (1) The second frame image is an overlapped or repeated frame image, or the third frame image is a repeated frame image. (2) A difference between the predicted pixel sequence obtained through S203 and the second pixel sequence is relatively small due to values of the first overlapping ratio and the second overlapping ratio adopted in S202, so that the mean error and the mean squared error are small. (3) When the first frame image and the second frame image are acquired, the picture transformation is relatively gentle.

Further practice shows that if the small overall difference is caused by the first reason or the second reason, the maximum error in this case is usually small (that is, the maximum error is usually less than or equal to the second threshold). If the small overall difference is caused by the third reason, the maximum error in this case is usually large (that is, the maximum error is usually greater than the second threshold). Therefore, when the overall difference between the first frame image and the second frame image is small, the frame type of the second frame image or the third frame image may still be recognized according to the size relationship between the maximum error and the second threshold, so as to reduce the effect of coding noise on frame type recognition. When the maximum error is greater than the second threshold, the frame type of the second frame image may be directly determined as the effective frame. When the maximum error is less than or equal to the second threshold, it may be indicated that there may be an overlapped or repeated frame image in the second frame image and the first frame image. In this case, the frame type of the second frame image or the third frame image may be further determined according to the first overlapping ratio and the second overlapping ratio.

Based on the above description, an error condition may be set during execution of S204, and the frame type of the second frame image or the third frame image is recognized by detecting whether the pixel error meets the error condition. The error condition herein may include at least one of the following: the mean error is greater than an error threshold, the mean squared error is greater than a first threshold, and the maximum error is greater than a second threshold. The error threshold, the first threshold, and the second threshold may be set according to empirical values or service requirements. For example, the error threshold may be set to 0.01, the first threshold to 1e-6 (that is, 1 times 10 to the minus $6^{th}$ power), the second threshold to 0.3. When the pixel error meets the error condition, it may be determined that the frame type of the second frame image is the effective frame; and when the pixel error does not meet the error condition, the frame type of the second frame image or the third frame image may be determined according to the first overlapping ratio and the second overlapping ratio.

A frame type of the first frame image in the embodiments of this disclosure is known, and the second frame image is located between the first frame image and the third frame image in the image frame sequence. During recognition of frame types of the second frame image and the third frame image, a predicted pixel sequence of the second frame image may be first obtained through prediction according to the first frame image and the third frame image. Pixel prediction is performed on the second frame image by using two image frames neighboring the second frame image, which can effectively improve the accuracy of the predicted pixel sequence. Next, a pixel error may be calculated according to an actual pixel sequence (a second pixel sequence) and the relatively accurate predicted pixel sequence of the second frame image, to effectively reduce an effect caused by coding noise, thereby improving the accuracy and stability of the pixel error. Then, a frame type of the second frame image or the third frame image may be recognized according to the relatively accurate pixel error, to improve the accuracy and stability of frame type recognition.

Figure 3:
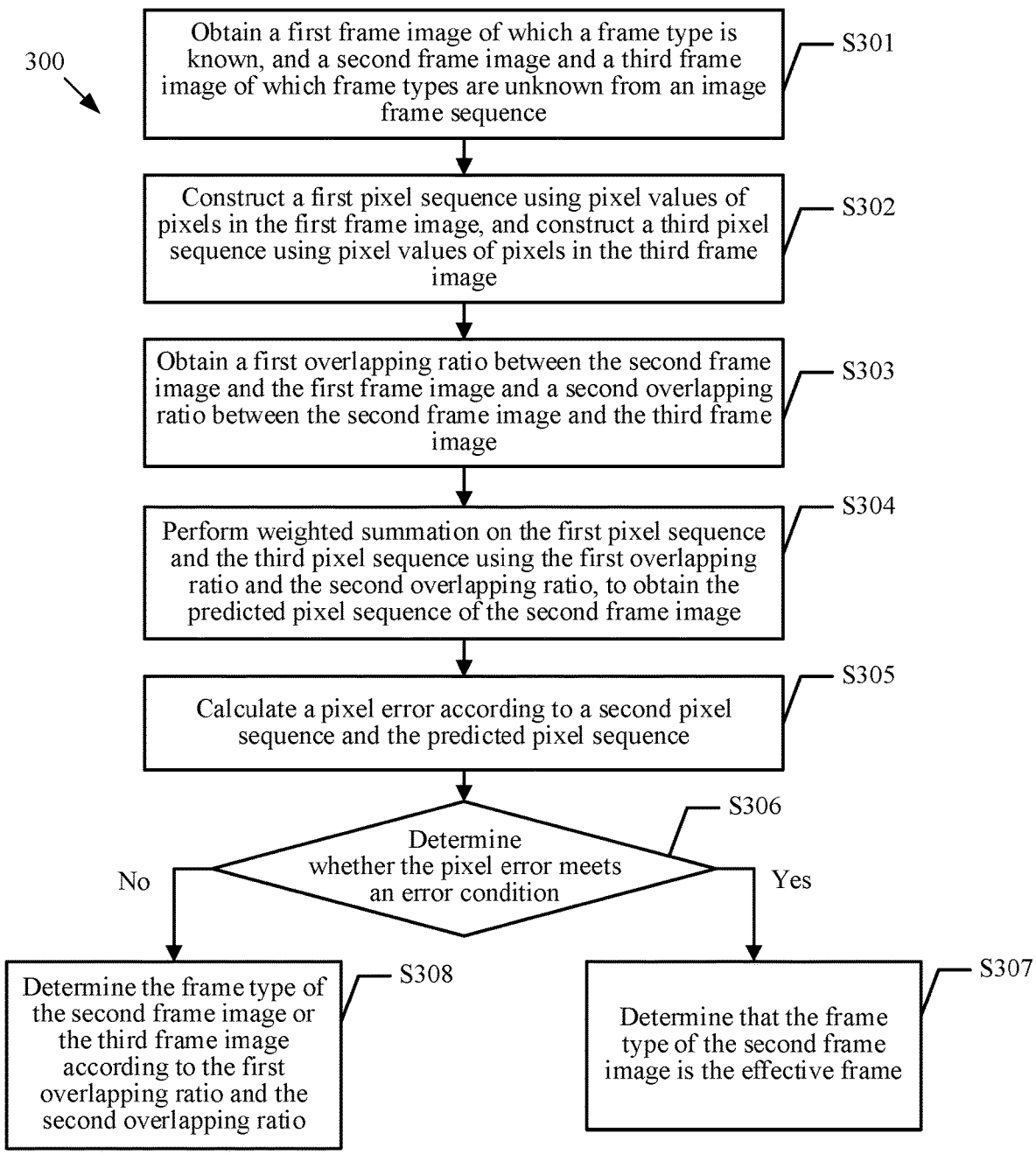
FIG. 3 is a schematic flowchart of an image recognition method according to an embodiment of this disclosure.

Based on the related description of the foregoing embodiment, an embodiment of this disclosure further provides a schematic flowchart of another image recognition method. The image recognition method may be performed by using a server in the foregoing video processing system. Referring to FIG. 3, the image recognition method 300 may include the following S301 to S308.

S301. Obtain a first frame image of which a frame type is known, and a second frame image and a third frame image of which frame types are unknown from an image frame sequence.

For a specific implementation of S301 in this embodiment of this disclosure, reference may be made to S201 in the foregoing embodiment for details. In an implementation, after the first frame image, the second frame image, and the third frame image are obtained through S301, S302 to S308 may be directly performed, to obtain a frame type of the second frame image or the third frame image through recognition. In yet another implementation, practice shows that when an interval between the second frame image and the first frame image is relatively long, it may be indicated that the second frame image is an effective frame image. Therefore, before S302 to S308 are performed, a time attribute of the first frame image and a time attribute of the second frame image may be further obtained, and an interval between the first frame image and the second frame image is calculated according to the time attribute of the first frame image and the time attribute of the second frame image. When the interval is greater than or equal to a duration threshold, it may be directly determined that the frame type of the second frame image is the effective frame. When the interval is less than the duration threshold, S302 to S308 may be performed.

S302. Construct a first pixel sequence by using pixel values of pixels in the first frame image, and construct a third pixel sequence by using pixel values of pixels in the third frame image.

S303. Obtain a first overlapping ratio between the second frame image and the first frame image and a second overlapping ratio between the second frame image and the third frame image.

During specific implementation, a first overlapping parameter between the second frame image and the first frame image and a second overlapping parameter between the second frame image and the third frame image may be first determined. Then, a fitting function may be constructed by using the first overlapping parameter, the second overlapping parameter, the first pixel sequence, the second pixel sequence, and the third pixel sequence, which is shown in formula 1.1.

$$ax + by = z \qquad \text{formula 1.1}$$

a indicates the first overlapping parameter, b indicates the second overlapping parameter, x indicates the first pixel sequence, y indicates the third pixel sequence, and z indicates the second pixel sequence.

Figure 4A:
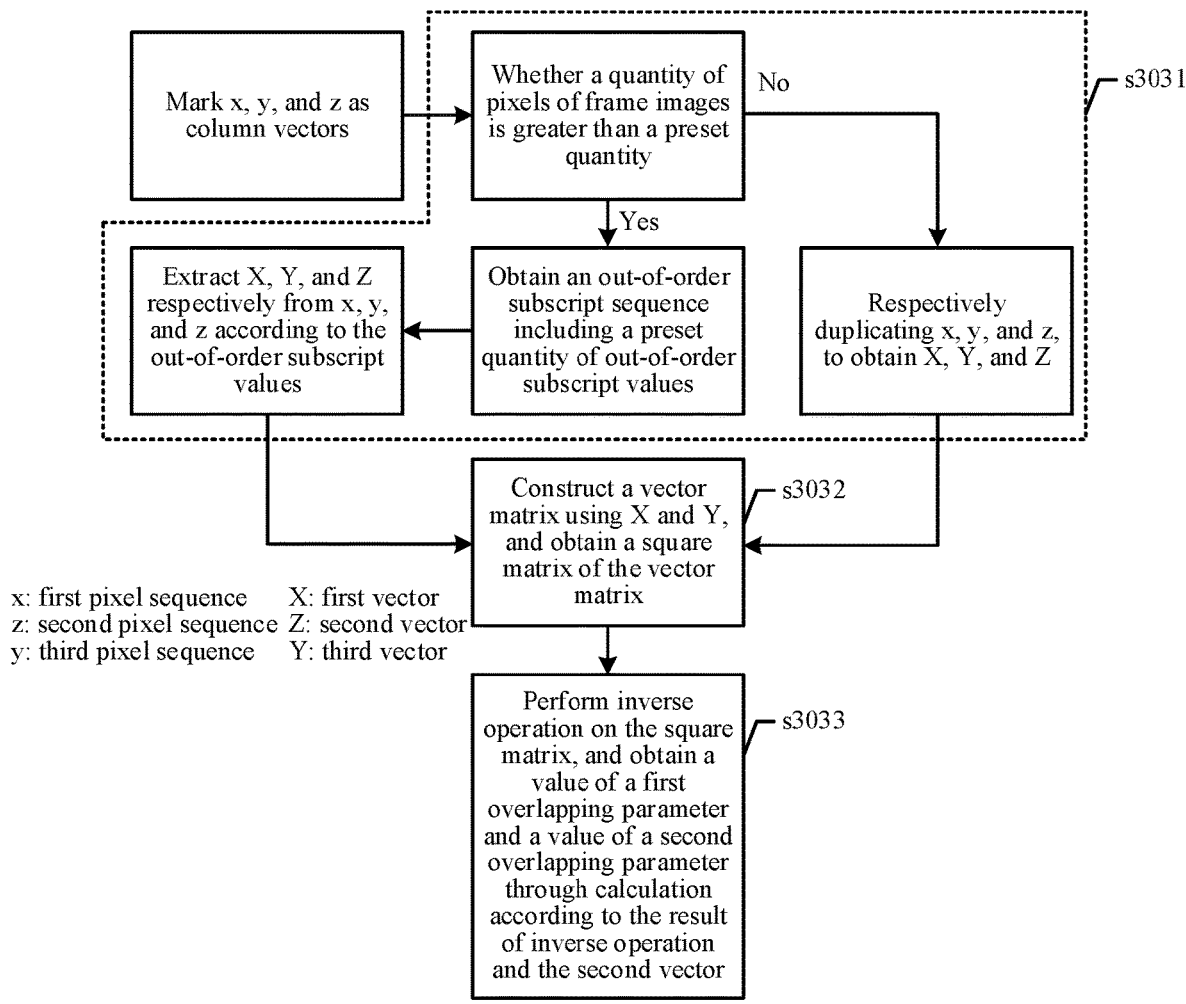
FIG. 4A is a schematic diagram of calculating a first overlapping ratio and a second overlapping ratio according to an embodiment of this disclosure.

After the fitting function is constructed, the fitting function may be resolved, to obtain a value of the first overlapping parameter and a value of the second overlapping parameter. The value of the first overlapping parameter is used for representing the first overlapping ratio between the second frame image and the first frame image, and the value of the second overlapping parameter is used for representing the second overlapping ratio between the second frame image and the third frame image. In an implementation, the fitting function may be resolved directly by using a least square algorithm, to obtain the value of the first overlapping parameter and the value of the second overlapping parameter. In yet another implementation, if the resolution of a video is large, a quantity of pixels of each frame of image in an image frame sequence of the video may be relatively large, that is, a quantity of pixel values in the first pixel sequence, the second pixel sequence, and the third pixel sequence is relatively large. In this case, if the fitting function is resolved directly by using the least square algorithm, it may take up a lot of memory and consume a lot of time, and the processing efficiency is low. Based on this, the least square algorithm is optimized in the embodiments of this disclosure, and the fitting function is resolved by using the optimized least square algorithm, to obtain the value of the first overlapping parameter and the value of the second overlapping parameter. In this implementation, for the specific implementation process of S303, reference may be made to FIG. 4A, which may specifically include the following s3031 to s3033.

s3031. Construct a first vector by using the first pixel sequence, construct a second vector by using the second pixel sequence, and construct a third vector by using the third pixel sequence.

During specific implementation, whether a quantity of pixels of frame images in the image frame sequence is greater than a preset quantity may be detected. The preset quantity herein may be set according to empirical values or actual service requirements. In an example in which the resolution of the video is 960*540, the preset quantity may be set to 518400 (that is, 960*540). When the quantity of the pixels of the frame images in the image frame sequence is less than or equal to the preset quantity, a vector corresponding to the first pixel sequence may be used as the first vector, a vector corresponding to the second pixel sequence is used as the second vector, and a vector corresponding to the third pixel sequence is used as the third vector.

When the quantity of pixels of frame images in the image frame sequence is greater than the preset quantity, pixel values of the preset quantity is extracted from the first pixel sequence to construct the first vector in difference manners, pixel values of the preset quantity is extracted from the second pixel sequence to construct the second vector in difference manners, and pixel values of the preset quantity is extracted from the third pixel sequence to construct the third vector in difference manners. Specifically, an out-of-order subscript sequence may be obtained, and the out-of-order subscript sequence includes a preset quantity of out-of-order subscript values, the out-of-order subscript value being used for indicating a location of a to-be-extracted pixel value in a pixel sequence. For example, if the out-of-order subscript value is "3", the out-of-order subscript value indicates that the 3rd pixel value is extracted from the pixel sequence. It is to be understood that the maximum out-of-order subscript value in the out-of-order subscript sequence is less than or equal to a quantity of pixels (that is, less than or equal to a quantity of pixel values included in the pixel sequence). In an implementation, during obtaining of the out-of-order subscript sequence, an out-of-order subscript sequence may be generated in real time. Specifically, a sequential subscript sequence may be first generated, and the sequential subscript sequence includes a preset quantity of sequential subscript values, the sequential subscript values being sequentially arranged in ascending order or in descending order, and the maximum sequential subscript value being less than or equal to the quantity of pixels. Then, the sequential subscript values in the sequential subscript sequence may be messed up in difference manners to obtain the out-of-order subscript sequence. For example, if the sequential subscript sequence is: 1, 2, 3, 5, 7, 8, 9, . . . , sequential subscript values in the sequential subscript sequence are messed up in difference manners, so as to obtain an out-of-order subscript sequence: 1, 3, 9, 7, 8, 5, 2, . . . , or to obtain an out-of-order subscript sequence: 2, 3, 1, 9, 8, 5, 7, . . . , and the like. In yet another implementation, during obtaining of the out-of-order subscript sequence, a historical subscript sequence that is historically generated may alternatively be obtained and used as the out-of-order subscript sequence, or a preset subscript sequence is obtained and used as the out-of-order subscript sequence. In this way, the time consumed by generating the out-of-order subscript sequence in real time can be reduced, thereby improving the processing efficiency.

After the out-of-order subscript sequence is obtained, a preset quantity of pixel values may be extracted from the first pixel sequence according to the out-of-order subscript values in the out-of-order subscript sequence, to construct a first vector. For example, if the out-of-order subscript sequence is: 1, 3, 9, 7, 8, 5, 2, . . . , a preset quantity of pixel values, such as the 1st pixel value, the 3rd pixel value, the 9th pixel value, the 7th pixel value, the 8th pixel value, the 5th pixel value, and the 2nd pixel value, may be sequentially extracted from the first pixel sequence, to construct a first vector. Similarly, a preset quantity of pixel values may be extracted from the second pixel sequence according to the out-of-order subscript values in the out-of-order subscript sequence, to construct a second vector, and a preset quantity of pixel values may be extracted from the third pixel sequence according to the out-of-order subscript values in the out-of-order subscript sequence, to construct a third vector.

s3032. Construct a vector matrix by using the first vector and the third vector, and obtain a square matrix corresponding to the vector matrix.

During specific implementation, X may be used to represent the first vector, Z is used to represent the second vector, Y is used to represent the third vector, and M is used to represent the vector matrix. Therefore, the vector matrix M constructed by using the first vector and the third vector may be represented as: M=[X, Y]. The square matrix corresponding to the vector matrix refers to a matrix with the same quantity of rows and columns. During obtaining of the square matrix corresponding to the vector matrix, a transpose matrix of the vector matrix may be directly obtained (which is represented by using $M^T$), where the transpose matrix refers to a matrix obtained by interchanging rows and columns in the vector matrix. Then, the transpose matrix is multiplied by the vector matrix, to obtain the square matrix (which is represented by using $M^TM$). Alternatively, the square matrix of the vector matrix may be calculated in a manner of a block matrix, to increase the calculation speed or reduce the memory. Accordingly, a specific implementation of obtaining a square matrix corresponding to the vector matrix may be as follows:

Firstly, the vector matrix is divided into a plurality of sub-vector matrices. For example, the vector matrix M may be divided into n sub-vector matrices in a manner of upper and lower division, and the sub-vector matrices may be respectively represented as: $m_1, m_2, \ldots,$ and $m_n$, n being a positive integer. Next, sub-square matrices corresponding to the plurality of sub-vector matrices may be obtained. Specifically, a sub-transpose matrix of each sub-vector matrix may be calculated by using a plurality of threads in parallel, and multiplication operation is performed on the each sub-vector matrix and the sub-transpose matrix of the each sub-vector matrix in parallel, to obtain a sub-square matrix corresponding to the each sub-vector matrix. To be specific, $m_i^T m_i$ (i=1, . . . , n) may be calculated by using a plurality of threads in parallel, to increase the calculation speed. Alternatively, a sub-transpose matrix of each sub-vector matrix is sequentially calculated by using one thread, and multiplication operation is sequentially performed on the each sub-vector matrix and the sub-transpose matrix of the each sub-vector matrix, to obtain a sub-square matrix corresponding to the each sub-vector matrix. To be specific, $m_i^T m_i$ are sequentially calculated by using one thread, to reduce memory usage. Then, summation operation may be performed on the sub-square matrices corresponding to the plurality of sub-vector matrices, to obtain the square matrix corresponding to the vector matrix. To be specific, the square matrix $M^TM = \Sigma(m_i^T m_i)$.

s3033. Perform inverse operation on the square matrix, and obtain the value of the first overlapping parameter and the value of the second overlapping parameter through calculation according to the result of inverse operation and the second vector.

In an implementation, inverse operation may be directly performed on the square matrix, and then, the value of the first overlapping parameter and the value of the second overlapping parameter are obtained through calculation according to the result of inverse operation and the second vector. In this implementation, a calculation formula of s3033 may be shown in formula 1.2, where superscript −1 represents inverse operation.

$$(a, b) = (M^T M)^{-1} M^T Z \qquad \text{formula 1.2}$$

In yet another implementation, to avoid the situation that there is no solution when an inverse operation is performed on the matrix, when inverse operation is performed on the square matrix in the embodiments of this disclosure, full rank processing may be first performed on the square matrix by using an identity matrix, and then, inverse operation is performed on the square matrix after full rank processing. The identity matrix refers to a matrix in which elements on the diagonal from the upper left corner to the lower right corner are all 1 and the other elements are all 0. The principle of full rank processing is as follows: performing scaling on the identity matrix with a dimension of K by using a minimal constant, and performing summation on the scaled identity matrix and the square matrix. A corresponding calculation formula may be shown in formula 1.3.

$$M^T M + \alpha \cdot e(k) \qquad \text{formula 1.3}$$

where α indicates the minimal constant. A value of the minimal constant may be set according to empirical values. For example, the value of α may be set to 1e-6. e(k) indicates the identity matrix with a dimension of K, and a value of K may be set according to a quantity of overlapping parameters. For example, two overlapping parameters (that is, the first overlapping parameter and the second overlapping parameter) are related in the embodiments of this disclosure, and therefore, the value of K is 2. Symbol · indicates the multiplication operation. Therefore, α·e(k) indicates that all elements in the identity matrix with a dimension of K are multiplied by the minimal constant α. Research shows that, α·e(k) can ensure that there is a solution when an inverse operation is performed on the matrix, and the accuracy of the least square algorithm is hardly affected.

After the result of inverse operation is obtained by performing inverse operation on the square matrix after full rank processing, the value of the first overlapping parameter and the value of the second overlapping parameter may be obtained through calculation according to the result of inverse operation and the second vector. In this implementation, a calculation formula of s3033 may be shown in formula 1.4.

$$(a, b) = (M^T M + \alpha \cdot e(k))^{-1} M^T Z \qquad \text{formula 1.4}$$

S304. Perform weighted summation on the first pixel sequence and the third pixel sequence by using the first overlapping ratio and the second overlapping ratio, to obtain the predicted pixel sequence of the second frame image.

S305. Calculate a pixel error according to a second pixel sequence and the predicted pixel sequence of the second frame image, the second pixel sequence including pixel values of the pixels in the second frame image.

It can be known from the above that the pixel error may include at least one of the following: a mean error, a mean squared error, and a maximum error. In an implementation, when the pixel error includes the mean error, a specific implementation of S305 may be as follows: firstly, respectively calculating differences between the pixel values and the prediction values of the pixels in the second frame image; next, obtaining a sum of the differences between the pixel values and the prediction values of the pixels; and then, calculating a ratio of the sum of the differences and a sequence length of the second pixel sequence, to obtain the mean error, where the sequence length of the second pixel sequence is equal to a quantity of the pixels of the second frame image.

In yet another implementation, when the pixel error includes the mean squared error, a specific implementation of S305 may be as follows: firstly, respectively calculating differences between the pixel values and the prediction values of the pixels in the second frame image; next, respectively performing square operation on the differences between the pixel values and the prediction values of the pixels, to obtain squares of the differences corresponding to the pixels, and resolving a sum of the squares of the differences corresponding to the pixels; and then, calculating a ratio of the sum of the squares of the differences and the sequence length of the second pixel sequence, and obtaining the mean squared error according to the ratio obtained through calculation. Based on this, a specific implementation of S305 may be represented by using the following formula 1.5.

$$\varepsilon_1 = \left[\sum_{j=1}^{N} (z_j - \bar{z}_j)^2 / N\right]^{0.5} \qquad \text{formula 1.5}$$

$\varepsilon_1$ indicates the mean squared error, N indicates the sequence length of the second pixel sequence, $z_j$ indicates the $j^{th}$ pixel value in the second pixel sequence, and $\bar{z}_j$ indicates the $j^{th}$ prediction value in the predicted pixel sequence.

In yet another implementation, when the pixel error includes the maximum error, a specific implementation of S305 may be as follows: firstly, respectively calculating absolute values of differences between the pixel values and the prediction values of the pixels in the second frame image; next, selecting a target pixel from the second frame image according to the absolute values of the differences between the pixel values and the prediction values of the pixels, where the target pixel herein refers to a pixel having a maximum absolute value of a difference between a pixel value and a prediction value in the second frame image; and then, calculating a ratio of the absolute value of the difference of the target pixel and the sequence length of the second pixel sequence, and obtaining the maximum error according to the ratio obtained through calculation. Based on this, a specific implementation of S305 may be represented by using the following formula 1.6.

$$\varepsilon_2 = [\max|z_j - \bar{z}_j|^2 / N]^{0.5} \qquad \text{formula 1.6}$$

$\varepsilon_2$ indicates the mean squared error, and max indicates selecting the maximum absolute value of the difference.

S306. Determine whether the pixel error meets an error condition. The error condition herein includes at least one of the following: the mean error is greater than an error threshold, the mean squared error is greater than a first threshold, and the maximum error is greater than a second threshold.

S307. Determine, when the pixel error meets the error condition, that the frame type of the second frame image is the effective frame.

S308. Determine, when the pixel error does not meet the error condition, the frame type of the second frame image or the third frame image according to the first overlapping ratio and the second overlapping ratio, During specific implementation, the frame type of the second frame image or the third frame image may be recognized according to size relationships between the first overlapping ratio and a ratio threshold and between the second overlapping ratio and the ratio threshold. The ratio threshold herein may be set according to empirical values or actual service requirements. For example, the ratio threshold may be set to 0.99 (that is, 99%). Specifically, when the first overlapping ratio is greater than the ratio threshold (such as 99%), it may be indicated that 99% of the second frame image is formed by the first frame image. In this case, it may be determined that the second frame image is a repeated frame of the first frame image. Therefore, it may be determined that the frame type of the second frame image is the repeated frame. When the second overlapping ratio is greater than the ratio threshold (such as 99%), it may be indicated that 99% of the third frame image is formed by the second frame image. In this case, it may be determined that the third frame image is a repeated frame of the second frame image. Therefore, it may be determined that the frame type of the third frame image is the repeated frame. When both the first overlapping ratio and the second overlapping ratio are less than or equal to the ratio threshold, it may be indicated that the second frame image is obtained by mixing the first frame image and the third frame image. In this case, it may be determined that the second frame image is an overlapped frame image obtained by performing weighted overlapping on the first frame image and the third frame image. Therefore, it may be determined that the frame type of the second frame image is the overlapped frame.

Figure 4B:
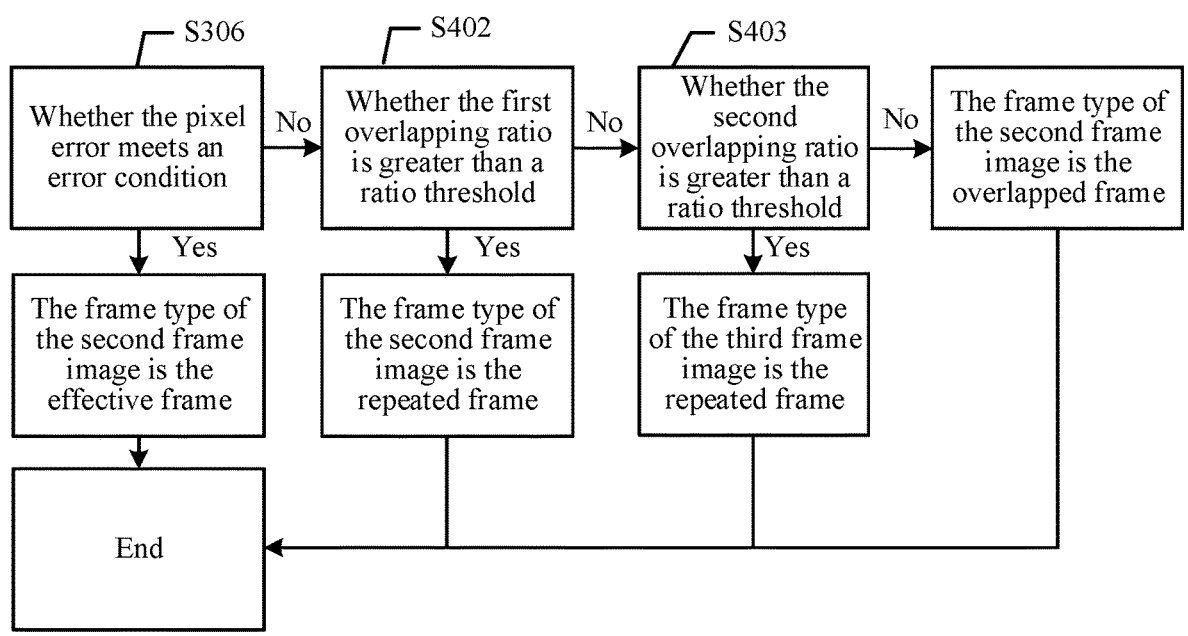
FIG. 4B is a schematic diagram of recognizing a frame type of a second frame image or a third frame image according to a first overlapping ratio and a second overlapping ratio according to an embodiment of this disclosure.

In this implementation, a schematic flowchart of S306 to S308 may also be shown in FIG. 4B. It is to be understood that FIG. 4B is only an exemplary representation of specific implementation processes of S306 to S308, and does not limit the implementation processes. For example, in FIG. 4B, the step S402 of determining whether the first overlapping ratio is greater than the ratio threshold is performed, and then, the step S402 of determining whether the second overlapping ratio is greater than the ratio threshold is performed. However, during actual application, the step S402 of determining whether the second overlapping ratio is greater than the ratio threshold may alternatively be performed, and then, the step S402 of determining whether the first overlapping ratio is greater than the ratio threshold is performed. Alternatively, the step S402 of determining whether the first overlapping ratio is greater than the ratio threshold and the step S401 of determining whether the second overlapping ratio is greater than the ratio threshold are performed simultaneously.

In yet another specific implementation, the first overlapping ratio and the second overlapping ratio are usually greater than or equal to 0. However, it can be known from the above that the first overlapping ratio and the second overlapping ratio may be resolved by using the least square algorithm. Research shows that, when there is an overlapped or repeated frame image in the second frame image and the third frame image, due to the error in the least square algorithm, values of the first overlapping ratio and the second overlapping ratio may be slightly less than 0. Therefore, when the first overlapping ratio and the second overlapping ratio are obviously less than 0, it may be indicated that the second frame image is not the overlapped or repeated frame image, that is, it may be determined that the frame type of the second frame image is the effective frame. Based on this, whether the first overlapping ratio and the second overlapping ratio are less than a third threshold may be detected. The third threshold herein (represented by using $-T_3$) is a negative number, and may be set according to empirical values or actual service requirements. For example, the third threshold is set to −0.01. When the first overlapping ratio (represented by using A) is less than the third threshold or the second overlapping ratio (represented by using B) is less than the third threshold, that is, $A<-T_3$ or B is less than $-T_3$, it may be determined that the frame type of the second frame image is the effective frame. Otherwise, the frame type of the second frame image or the third frame image may be further recognized according to a sum of the first overlapping ratio and the second overlapping ratio.

When the frame type of the second frame image or the third frame image is recognized according to the sum of the first overlapping ratio and the second overlapping ratio, at least the following two types of implementation may be included.

Implementation 1: research shows that, when there is an overlapped or repeated frame image in the second frame image and the third frame image, a sum of the first overlapping ratio and the second overlapping ratio is usually a fixed reference value. The reference value herein may be set according to empirical values. For convenience of explanation, an example in which the reference value is equal to 1 is used for description. Therefore, whether the sum of the first overlapping ratio and the second overlapping ratio is equal to the reference value may be detected. When the sum is equal to the reference value (that is, |A+B|=1), it may be determined that there is a frame image of which the frame type is the overlapped frame or the repeated frame in the second frame image and the third frame image. When the sum does not equal to the reference value, it may be determined that the frame type of the second frame image is the effective frame. Based on this, it may be concluded that a specific implementation of S308 may be: detecting whether the first overlapping ratio and the second overlapping ratio meet a threshold condition, the threshold condition herein includes at least one of the following: the first overlapping ratio is less than the third threshold (that is, $A<-T_3$), the second overlapping ratio is less than the third threshold (that is, $B<-T_3$), or a sum of the first overlapping ratio and the second overlapping ratio is equal to the reference value (that is, |A+B|=1); determining, when the first overlapping ratio and the second overlapping ratio meet the threshold condition, that the frame type of the second frame image is the effective frame; and determining, when the threshold condition is not met, that there is a frame image of which the frame type is the overlapped frame or the repeated frame in the second frame image and the third frame image.

Figure 4C:
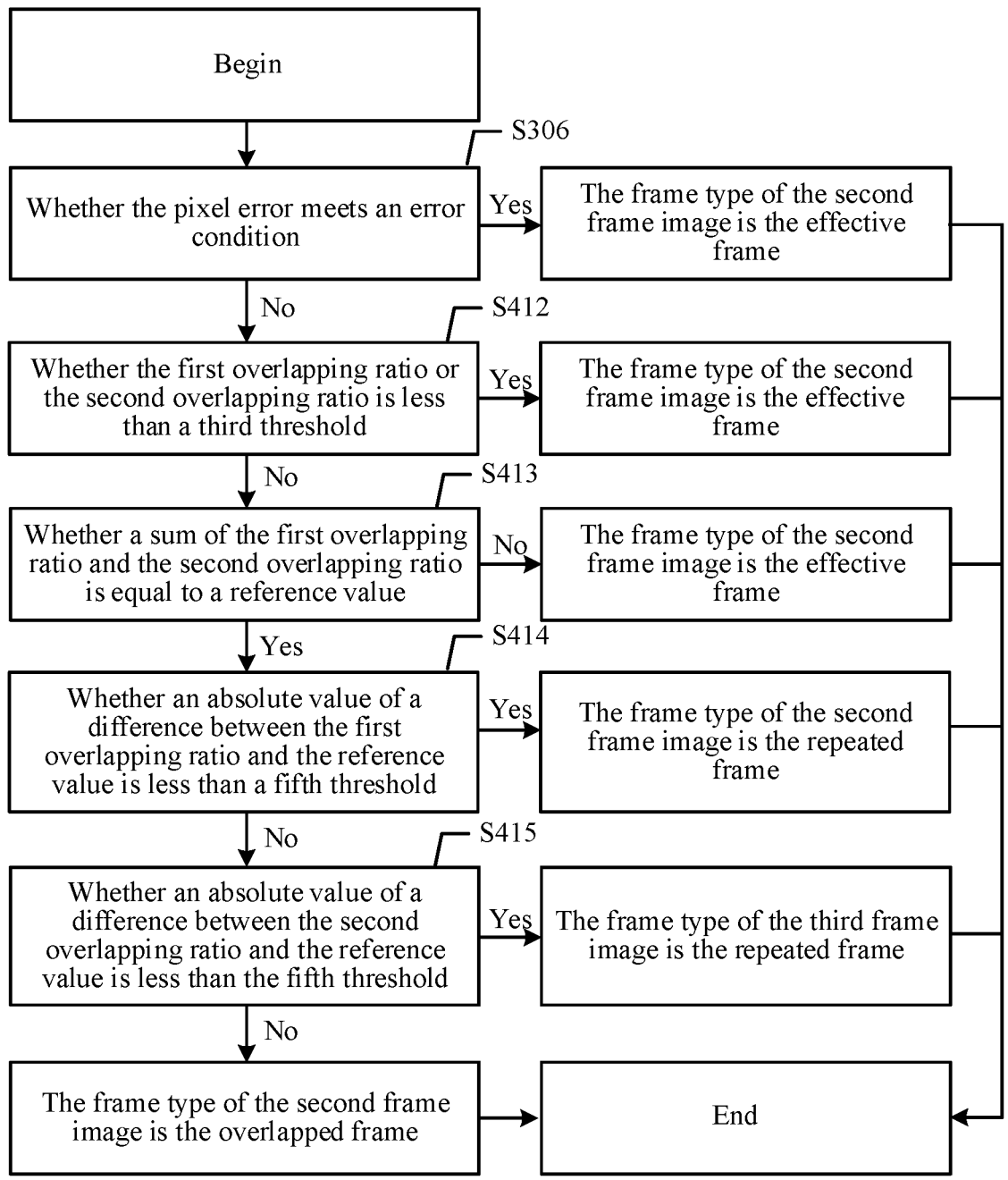
FIG. 4C is another schematic diagram of recognizing a frame type of a second frame image or a third frame image according to a first overlapping ratio and a second overlapping ratio according to an embodiment of this disclosure.

In this implementation, a schematic flowchart of S306 to S308 may also be shown in FIG. 4C. It is to be understood that FIG. 4C is only an exemplary representation of specific implementation processes of S306 to S308, and does not limit the implementation processes. For example, in FIG. 4C, the step S412 of determining whether the first overlapping ratio or the second overlapping ratio is less than the third threshold is performed, and then, the step S413 of determining whether a sum of the first overlapping ratio and the second overlapping ratio is equal to the reference value is performed. However, during actual application, the step S413 of determining whether a sum of the first overlapping ratio and the second overlapping ratio is equal to the reference value may alternatively be performed, and then, the step S412 of determining whether the first overlapping ratio or the second overlapping ratio is less than the third threshold is performed. Alternatively, the step S412 of determining whether the first overlapping ratio or the second overlapping ratio is less than the third threshold and the step S413 of determining whether a sum of the first overlapping ratio and the second overlapping ratio is equal to the reference value are performed simultaneously.

Implementation 2: the first overlapping ratio and the second overlapping ratio may be resolved by using the least square algorithm, and due to the error in the least square algorithm, the sum of the first overlapping ratio and the second overlapping ratio may be slightly different from the reference value (such as "1"). Based on this, to improve the accuracy of frame type recognition, it may be determined whether an absolute value of a difference between an absolute value of the sum of the first overlapping ratio and the second overlapping ratio and the reference value (such as "1") is greater than a fourth threshold. The fourth threshold herein (represented by using $T_4$) is a positive number, and may be set according to empirical values or actual service requirements. For example, the fourth threshold may be 0.01. When the result is greater than the fourth threshold (that is, $||A+B|-1|>T_4$), it may be determined that the frame type of the second frame image is the effective frame. When the result is not greater than the fourth threshold, it may be determined that there is a frame image of which the frame type is the overlapped frame or the repeated frame in the second frame image and the third frame image. Based on this, it may be concluded that a specific implementation of S308 may be: detecting whether the first overlapping ratio and the second overlapping ratio meet a ratio condition, the ratio condition herein includes at least one of the following: the first overlapping ratio is less than the third threshold (that is, $A<-T_3$), the second overlapping ratio is less than the third threshold (that is, $B<-T_3$), or an absolute value of a difference between an absolute value of the sum of the first overlapping ratio and the second overlapping ratio and the reference value is greater than the fourth threshold (that is, $||A+B|-1|>T_4$); determining, when the first overlapping ratio and the second overlapping ratio meet the ratio condition, that the frame type of the second frame image is the effective frame; and determining, when the first overlapping ratio and the second overlapping ratio do not meet the ratio condition, that there is a frame image of which the frame type is the overlapped frame or the repeated frame in the second frame image and the third frame image.

Figure 4D:
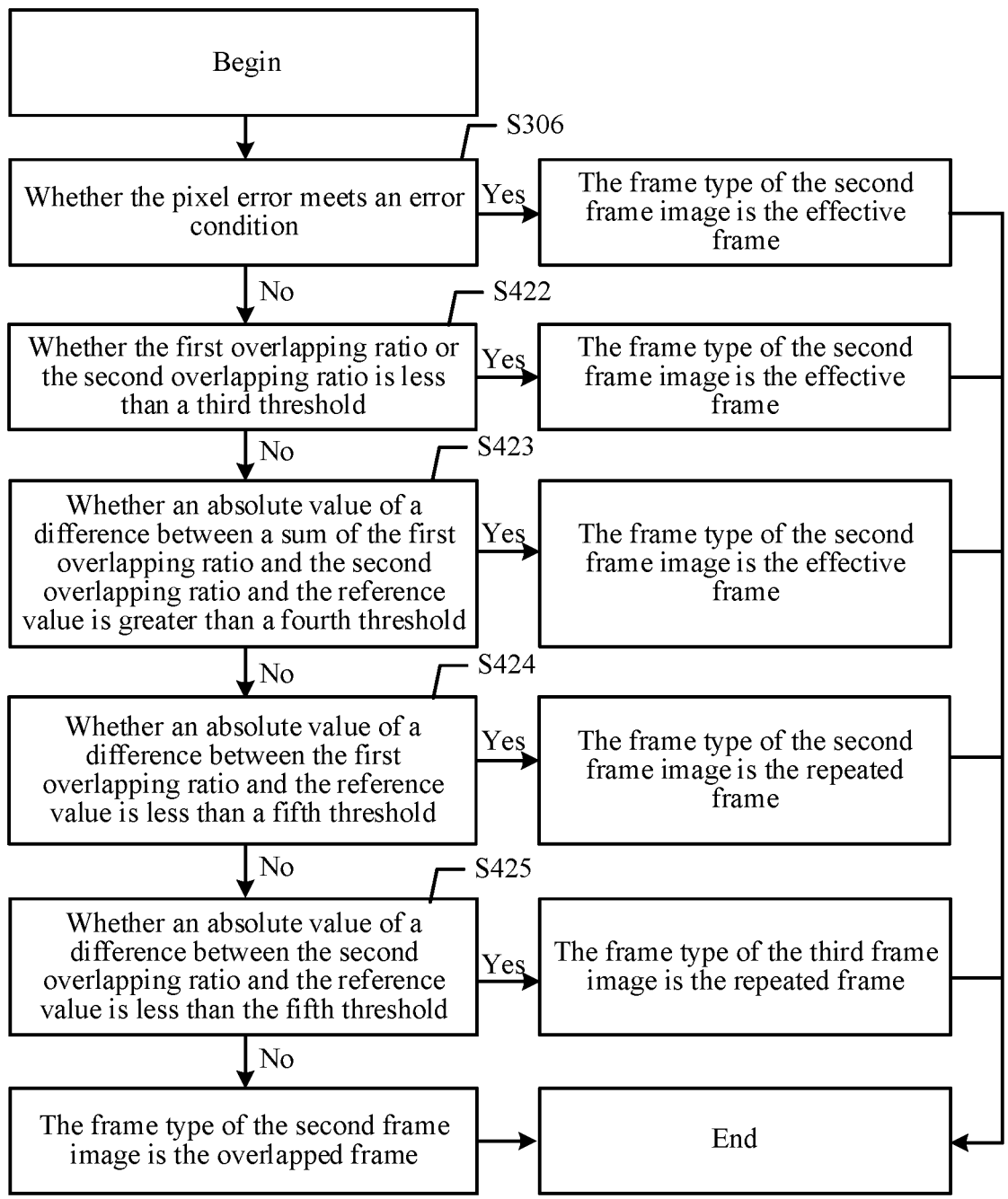
FIG. 4D is another schematic diagram of recognizing a frame type of a second frame image or a third frame image according to a first overlapping ratio and a second overlapping ratio according to an embodiment of this disclosure.

In this implementation, a schematic flowchart of S306 to S308 may also be shown in FIG. 4D. It is to be understood that FIG. 4D is only an exemplary representation of specific implementation processes of S306 to S308, and does not limit the implementation processes. For example, in FIG. 4D, the step S422 of determining whether the first overlapping ratio or the second overlapping ratio is less than the third threshold is performed, and then, the step S423 of determining whether an absolute value of a difference between an absolute value of the sum of the first overlapping ratio and the second overlapping ratio and the reference value is greater than the fourth threshold is performed. However, during actual application, the step S423 of determining whether an absolute value of a difference between an absolute value of the sum of the first overlapping ratio and the second overlapping ratio and the reference value is greater than the fourth threshold may alternatively be performed, and then, the step S422 of determining whether the first overlapping ratio or the second overlapping ratio is less than the third threshold is performed. Alternatively, the step S422 of determining whether the first overlapping ratio or the second overlapping ratio is less than the third threshold and the step S423 of determining whether an absolute value of a difference between an absolute value of the sum of the first overlapping ratio and the second overlapping ratio and the reference value is greater than the fourth threshold are performed simultaneously.

Referring to FIG. 4C and FIG. 4D, after it is determined that there is a frame image of which the frame type is the overlapped frame or the repeated frame in the second frame image and the third frame image, the frame type of the second frame image or the third frame image may be further determined according to the size relationship between a difference that is between the first overlapping ratio and the reference value and a fifth threshold, and between a difference that is between the second overlapping ratio and the reference value and the fifth threshold. The fifth threshold herein (represented by using $T_5$) may be set according to empirical values or actual service requirements. For example, the fifth threshold may be set to 0.01. Specifically, when an absolute value of a difference between the first overlapping ratio and the reference value is less than the fifth threshold (that is, $|A-1|<T_5$), it may be indicated that the second frame image is basically formed by the first frame image. Therefore, it may be determined that the frame type of the second frame image is the repeated frame; when an absolute value of a difference between the second overlapping ratio and the reference value is less than the fifth threshold (that is, $|B-1|<T_5$), it may be indicated that the third frame image is basically formed by the second frame image. Therefore, it may be determined that the frame type of the third frame image is the repeated frame; and when both the absolute value of the difference between the first overlapping ratio and the reference value and the absolute value of the difference between the second overlapping ratio and the reference value are greater than or equal to the fifth threshold, it may be indicated that the second frame image is obtained by mixing the first frame image and the third frame image according to the first overlapping ratio and the second overlapping ratio. Therefore, it may be determined that the frame type of the second frame image is the overlapped frame. It may be seen that in the image recognition method provided in the embodiments of this disclosure, respective proportions of the second frame image in the first frame image and the third frame image may be accurately obtained while determining that the frame type of the second frame image is the overlapped frame.

The foregoing S301 to S308 are only a schematic representation of a recognition process of frame type recognition for a frame image in an image frame sequence. During actual application, a server may iteratively and repeatedly perform S301 to S308 until the frame type of each frame image in the image frame sequence is recognized. Then, the server may perform frame insertion and transcoding on frame images of which the frame type is the effective frame in the image frame sequence, to obtain transcoded data, and deliver the transcoded data to a terminal device, so that the terminal device invokes an internal client to perform video playback according to the transcoded data. To enable better iterative execution of S301 to S308, a data structure may be used for caching the first frame image, the second frame image, and the third frame image involved in each recognition process. To be specific, the first frame image, the second frame image, and the third frame image in each recognition process may be cached in the data structure. The data structure herein refers to the way that the computer stores and organizes data, which may include but is not limited to: a queue, a stack, an array, a linked list, a tree, a hash table, and the like. After each recognition process, there are two frame images of known frame type and one frame image of unknown frame type in the first frame image, the second frame image, and the third frame image cached by the data structure. In this case, one frame image of known frame type may be popped up from the data structure, so as to leave a cache space in the data structure to cache a frame image of unknown frame type to be recognized in the next round, thus starting the next round of recognition process. Specifically, when the frame type of the second frame image is the effective frame, the first frame image may be popped up from the data structure, and the first frame image is transcoded and stored. When the frame type of the second frame image is the overlapped frame or the repeated frame, the second frame image may be popped up from the data structure and destroyed. When the frame type of the third frame image is the repeated frame, the third frame image may be popped up from the data structure and destroyed. It may be seen that in the image recognition method provided in the embodiments of this disclosure, not only overlapped and repeated frame images in the image frame sequence may be recognized, but also the overlapped and repeated frame images may be destroyed. The method has relatively high recognition accuracy and strong recognition stability.

When S301 to S308 are iteratively and repeatedly performed to recognize the frame type of each frame image in the image frame sequence, in the last recognition, the data structure only includes two image frames: a reference frame image of known type (that is, the first frame image obtained in the last recognition) and the last frame image in the image frame sequence. The last frame image herein refers to a frame image on which frame type recognition is last performed in the image frame sequence. For example, assuming that there are a total of h image frames in the image frame sequence, when the $h^{th}$ frame image is a frame image on which frame type recognition is last performed, the last frame image is the $h^{th}$ frame image. When a frame type of the $h^{th}$ frame image has been recognized in the previous recognition process, the frame image on which frame type recognition is last performed may not be the $h^{th}$ frame image. In this case, if the $(h-1)^{th}$ frame image is a frame image on which frame type recognition is last performed, the last frame image is the (h−1)th frame image. When only two image frames are included in the data structure, the server may directly transcode and store the reference frame image. For the last frame image, the frame type of the last frame image may be recognized according to a pixel difference between the reference frame image and the last frame image. During specific implementation, an image difference between the reference frame image and the last frame image may be calculated according to pixel values of pixels in the reference frame image and pixel values of pixels in the last frame image. The image difference herein includes: a mean squared pixel error and a maximum pixel error between the reference frame image and the last frame image. When the mean squared pixel error is greater than the first threshold or the maximum pixel error is greater than the second threshold, the frame type of the last frame image is determined as the effective frame. In this case, the last frame image may be transcoded and stored. Otherwise, the frame type of the last frame image may be determined as the repeated frame. In this case, the last frame image may be destroyed. The mean squared pixel error between the reference frame image and the last frame image may be calculated by using the following formula 1.7, and The maximum pixel error between the reference frame image and the last frame image may be calculated by using the following formula 1.8.

$$\varepsilon_3 = \left[\sum_{j=1}^{U}(s_j - r_j)^2/U\right]^{0.5} \quad \text{formula 1.7}$$

$$\varepsilon_4 = \left[\max|s_j - r_j|^2/U\right]^{0.5} \quad \text{formula 1.8}$$

$\varepsilon_3$ indicates the mean squared pixel error, $\varepsilon_4$ indicates the maximum pixel error, U indicates a quantity of pixels included in the last frame image, $s_j$ indicates a pixel value of the $j^{th}$ pixel in the reference frame image, and $r_j$ indicates a pixel value of the $j^{th}$ pixel in the last frame image. max indicates selecting the maximum absolute value of the difference.

A frame type of the first frame image in the embodiments of this disclosure is known, and the second frame image is located between the first frame image and the third frame image in the image frame sequence. During recognition of frame types of the second frame image and the third frame image, a predicted pixel sequence of the second frame image may be first obtained through prediction according to the first frame image and the third frame image. Pixel prediction is performed on the second frame image by using two image frames neighboring the second frame image, which can effectively improve the accuracy of the predicted pixel sequence. Next, a pixel error may be calculated according to an actual pixel sequence (a second pixel sequence) and the relatively accurate predicted pixel sequence of the second frame image, to effectively reduce an effect caused by coding noise, thereby improving the accuracy and stability of the pixel error. Then, a frame type of the second frame image or the third frame image may be recognized according to the relatively accurate pixel error, to improve the accuracy and stability of frame type recognition.

Figure 5:
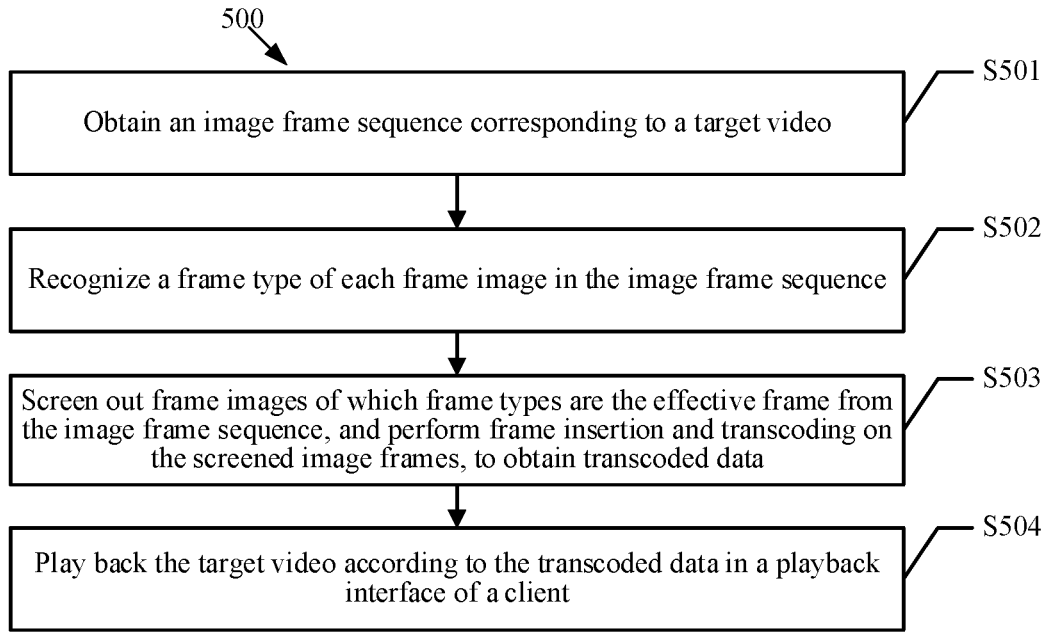
FIG. 5 is a schematic flowchart of a video playback method according to an embodiment of this disclosure.

Based on the embodiment of the image recognition method described above, an embodiment of this disclosure further provides a video playback method. The video playback method may be performed by a video processing device. The video processing device herein may be the server or the terminal device in the above-mentioned video processing system. Referring to FIG. 5, the video playback method 500 may include the following S501 to S504.

S501. Obtain an image frame sequence corresponding to a target video.

During specific implementation, the target video may be any video, such as a television video, a screen recording video, a short video, and the like. Specifically, the video processing device may first obtain video encoded data of the target video; next, perform decoding on the video encoded data, to obtain a decoded result; and then, perform pre-processing such as de-interlacing on the decoded result, to obtain an image frame sequence of the target video. The image frame sequence herein includes a plurality of frame images arranged in time sequence.

S502. Recognize a frame type of each frame image in the image frame sequence.

In the embodiments of this disclosure, the image frame sequence includes a plurality of frame images arranged in time sequence. A frame image with the first arrangement position in the image frame sequence is the first frame image, and a frame image on which frame type recognition is last performed in the image frame sequence is the last frame image. Frame types of frame images other than the first frame image and the last frame image in the image frame sequence are obtained through recognition by using the foregoing image recognition method. The frame type herein includes any one of the following: an effective frame, an overlapped frame, or a repeated frame, the effective frame being a non-repeated and non-overlapped frame in the image frame sequence.

A specific implementation process of S502 is illustrated below by using the recognition process shown in FIG. 6A, which may include the following s5021 to s5026:

s5021. Initialize a data structure, to cache frame images.

During specific implementation, a data structure may be constructed. The data structure herein may include, but is not limited to, a queue, a stack, a tree, and the like. The length of the data structure may be determined according to a maximum quantity of frame images required for image recognition. For example, in the embodiments of this disclosure, at most one frame image of known frame type and two frame images of unknown frame type are used in each image recognition, and therefore, the length of the data structure may be set to 3. Next, the data structure may be initialized, so that the initialized data structure has sufficient space to cache frame images.

s5022. Fill frame images in the image frame sequence into the data structure.

During specific implementation, when a quantity of frame images in the image frame sequence is greater than the length of the data structure, a frame type of the first frame image in the image frame sequence may be marked as an effective frame, and the first frame image is filled into the data structure as a first frame image. Then, the 2nd frame image and the 3rd frame image may be sequentially obtained from the image frame sequence as a second frame image and a third frame image, and filled into the data structure. s5023 and s5024 are sequentially performed. When a quantity of frame images in the image frame sequence is less than the length of the data structure, frame images in the image frame sequence may be sequentially filled into the data structure. In this case, processing of the image frame sequence is completed, and s5026 may be directly performed.

s5023. Recognize frame types of frame images of which frame types are unknown in the data structure.

Figure 6A:
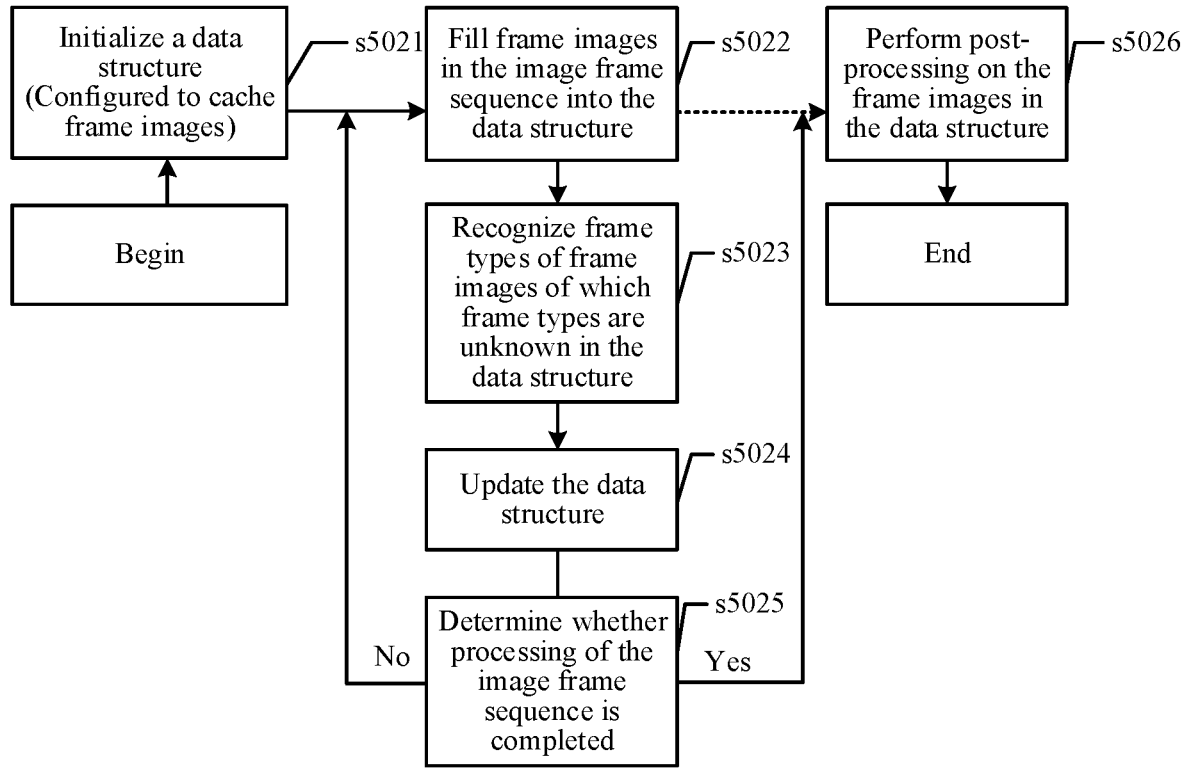
FIG. 6A is a schematic flowchart of performing image recognition on an image frame sequence according to an embodiment of this disclosure.
Figure 6B:
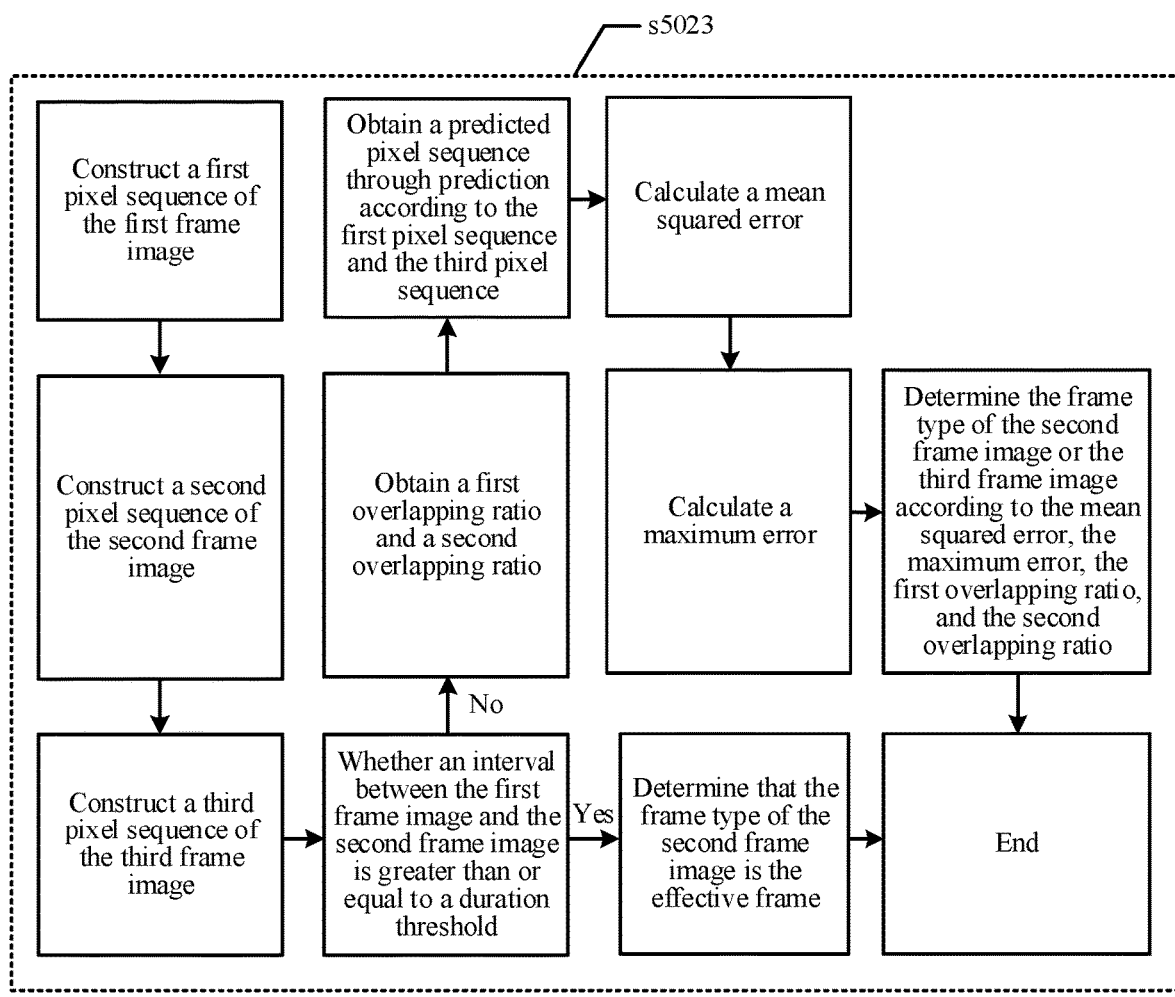
FIG. 6B is a schematic flowchart of performing frame type recognition on a frame image of which a frame type is unknown according to an embodiment of this disclosure.

During specific implementation, an implementation process of s5023 may also be shown in FIG. 6B: firstly, a first pixel sequence may be constructed by using pixel values of pixels in the first frame image, a second pixel sequence may be constructed by using pixel values of pixels in the second frame image, and a third pixel sequence may be constructed by using pixel values of pixels in the third frame image. Secondly, whether an interval between the first frame image and the second frame image is greater than or equal to a duration threshold may be detected. When the interval is greater than or equal to the duration threshold, it may be directly determined that the frame type of the second frame image is the effective frame. When the interval is less than the duration threshold, a first overlapping ratio and a second overlapping ratio may be obtained, and weighted summation is performed on the first pixel sequence and the third pixel sequence by using the first overlapping ratio and the second overlapping ratio, to obtain a predicted pixel sequence of the second frame image. Thirdly, a mean squared error and a maximum error may be calculated according to the second pixel sequence and the predicted pixel sequence. Finally, the frame type of the second frame image or the third frame image may be determined according to the mean squared error, the maximum error, the first overlapping ratio, and the second overlapping ratio. Specifically, when the mean squared error is greater than a first threshold or the maximum error is greater than a second threshold, it may be determined that the frame type of the second frame image is the effective frame. Otherwise, the frame type of the second frame image or the third frame image may be further recognized according to the first overlapping ratio and the second overlapping ratio. For specific description, reference may be made to the recognition process shown in FIG. 4B to FIG. 4D.

s5024. Update the data structure.

After s5023 is performed, there are two frame images of known frame type and one frame image of unknown frame type in the data structure. In this case, it is necessary to update the data structure to pop up one frame image of known frame type, and obtain a new cache space to store a next frame image of unknown frame type. During specific implementation, when the frame type of the second frame image is the effective frame, the first frame image is popped up from the data structure, and the first frame image is transcoded and stored. When the frame type of the second frame image is the overlapped frame or the repeated frame, the second frame image is popped up from the data structure and destroyed. When the frame type of the third frame image is the repeated frame, the third frame image is popped up from the data structure and destroyed. After a frame image of known frame type is popped up from the data structure, whether processing of the image frame sequence is completed may be determined through s5025. The processing completion herein means that all the frame images of unknown frame type in the image frame sequence have been cached in the data structure.

s5025. Determine whether processing of the image frame sequence is completed.

During specific implementation, whether there is a frame image of unknown frame type not filled into the data structure in the image frame sequence may be detected. If such a frame image does not exist, it may be determined that the processing of the image frame sequence is completed. In this case, s5026 may be directly performed. If such a frame image exists, it may be determined that the processing of the image frame sequence is not completed. In this case, s5022 may be performed again. After the data structure is updated through s5024, there are only one frame image of known frame type and one frame image of unknown frame type (that is, the second frame image) in the data structure. In this case, when s5022 is performed again, the frame image of known frame type included in the data structure may be directly used as the first frame image, and the frame image of unknown frame type included in the data structure may be used as the second frame image. Then, the first frame image of unknown frame type, remaining in the image frame sequence, that is not filled into the data structure may be obtained, and the obtained frame image is filled into the data structure as the third frame image.

s5026. Perform post-processing on the frame images in the data structure.

In one case, during execution of s5026, the data structure may include only one frame image of which the frame type is the effective frame. In this case, a specific implementation of s5026 may be: popping up the frame image of which the frame type is the effective frame from the data structure.

In another case, during execution of s5026, the data structure may include only one frame image of which the frame type is the effective frame and one frame image of unknown frame type (that is, the last frame image). In this case, a specific implementation of s5026 may be: Using the frame image of which the frame type is the effective frame and that is included in the data structure as a reference frame image of the last frame image, and calculating a mean squared pixel error and a maximum pixel error between the reference frame image and the last frame image according to pixel values of pixels in the reference frame image and pixel values of pixels in the last frame image; determining that the frame type of the last frame image is the effective frame when the mean squared pixel error is greater than a first threshold or the maximum pixel error is greater than a second threshold, and popping up the last frame image from the data structure; and otherwise, determining that the frame type of the last frame image is the repeated frame, and popping up the last frame image from the data structure.

S503. Filter out frame images of which frame types are the overlapped frame and the repeated frame from the image frame sequence, and perform frame insertion and transcoding on the filtered image frame sequence, to obtain transcoded data.

Figure 6C:
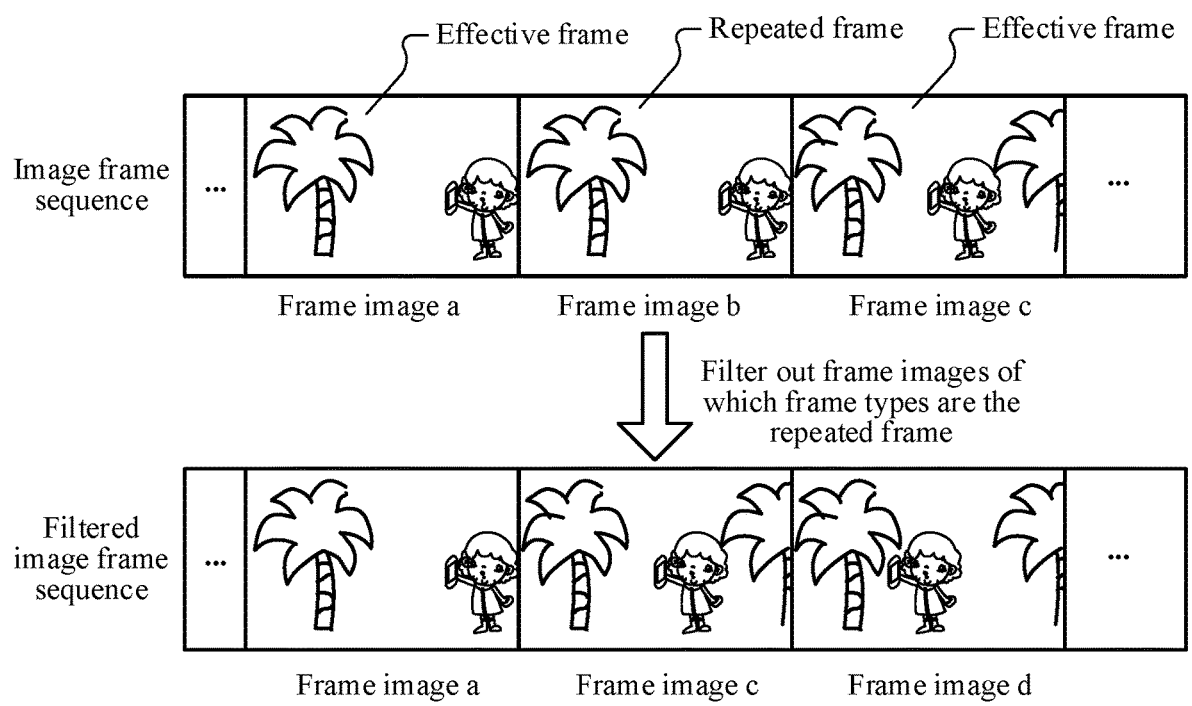
FIG. 6C is a schematic diagram of performing filtering on an image frame sequence according to an embodiment of this disclosure.
Figure 6D:
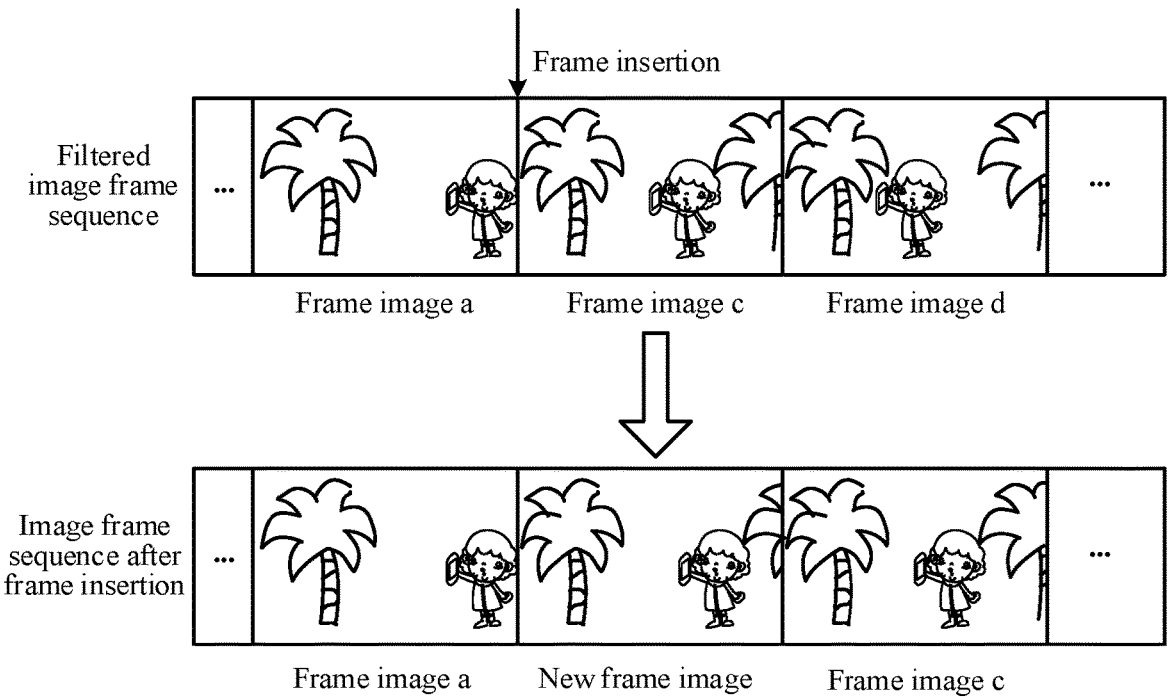
FIG. 6D is a schematic diagram of performing frame insertion on a filtered image frame sequence according to an embodiment of this disclosure.

During specific implementation, frame images of which frame types are the overlapped frame and the repeated frame may be sequentially deleted from the image frame sequence, to obtain the filtered image frame sequence. An example of deleting a frame image of which the frame type is the repeated frame is used, and a schematic diagram of the corresponding filtered image frame sequence may be shown in FIG. 6C. By filtering the overlapped or repeated frame images in the image frame sequence, the coherence of adjacent frame images before frame insertion may be ensured, so that a frame insertion algorithm can work effectively, and the problem of ghosting or poor effect caused by inputted frame images not meeting requirements may not be caused by using the frame insertion algorithm. Then, frame insertion may be performed on the filtered image frame sequence by using the frame insertion algorithm. It can be known from the above that the principle of the frame insertion algorithm is mainly to generate a new frame image by analyzing the motion mode of the same object in two adjacent image frames, so that a motion track of each object in the new frame image is the same as the motion track of the object in the previous and next two image frames. Therefore, in the embodiments of this disclosure, frame insertion is performed on the filtered image frame sequence by using the frame insertion algorithm, so that the new frame image inserted by using the frame insertion algorithm is not exactly the same as the previous and next two image frames, as shown in FIG. 6D. By using such a delicate processing method, the image frame sequence after frame insertion can provide better watching experience of the picture, so that the target video after frame insertion can present a smoother picture during playback, and it may be ensured that there is no jamming feeling during playback in slow motion. After the image frame sequence after frame insertion is obtained, the image frame sequence after frame insertion may be transcoded, to obtain transcoded data.

S504. Play back the target video according to the transcoded data in a playback interface of a client.

It can be known from the above that the video processing device for performing the video playback method provided in the embodiments of this disclosure may be a server or a terminal device. If the video processing device is the server, a specific implementation of S504 may be: delivering the transcoded data to the terminal device, so that the terminal device plays back the target video according to the transcoded data in a playback interface of a client. In this case, transcoded data of the target video with a high frame rate is generated through server by uniformly using the high-quality frame insertion algorithm, so that the process of frame insertion and transcoding does not need to be constrained by the performance of the terminal device, and it may be ensured that the target video has better image quality experience. If the video processing device is the terminal device, a specific implementation of S504 may be: directly playing back the target video according to the transcoded data of the target video in a playback interface of a client.

Figure 6E:
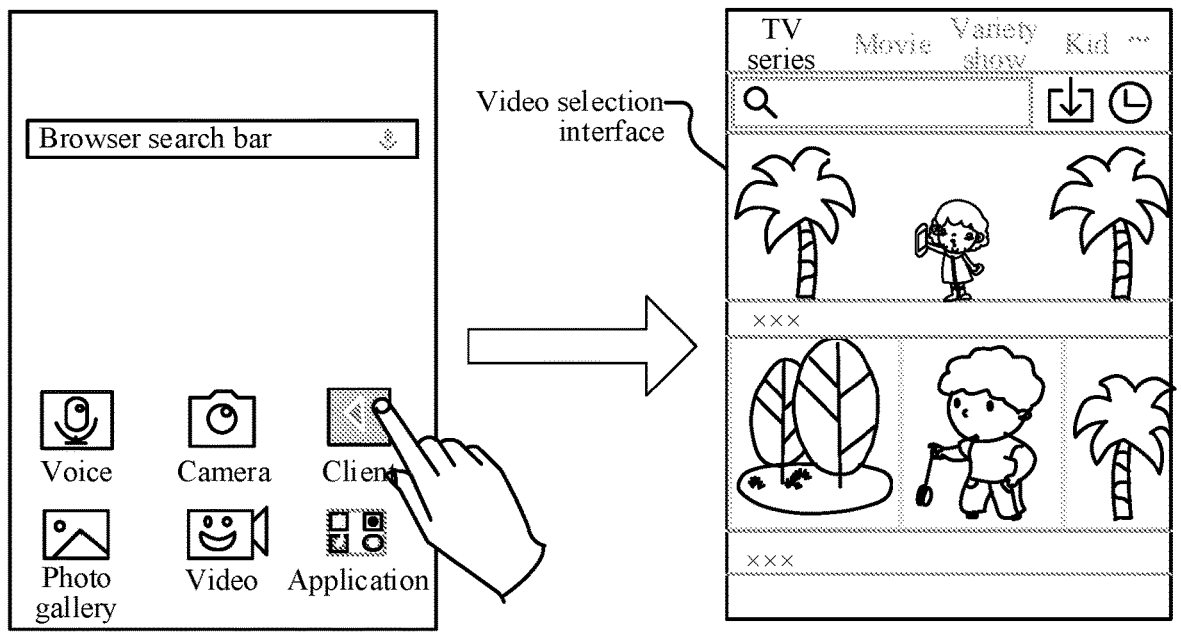
FIG. 6E is a diagram of an application scenario of a video playback method according to an embodiment of this disclosure.
Figure 6F:
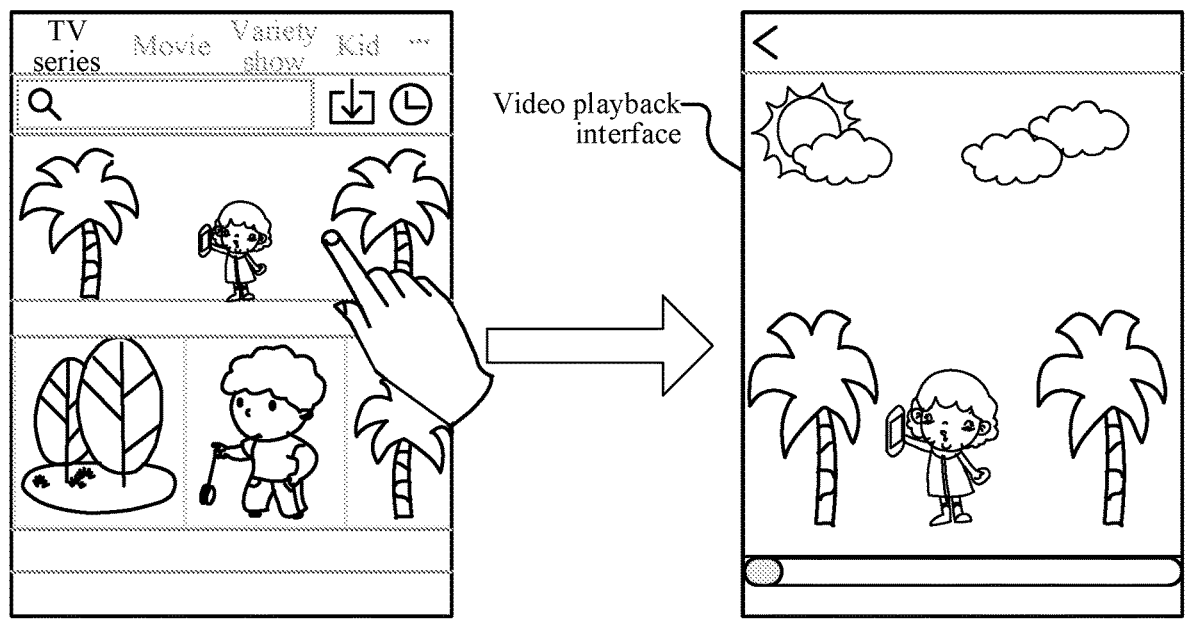
FIG. 6F is a diagram of another application scenario of a video playback method according to an embodiment of this disclosure.

The specific execution time of S501 to S504 is not limited in the embodiments of this disclosure. For example, in the embodiments of this disclosure, the transcoded data of the target video may be generated in advance through S501 to S503, that is, the transcoded data of the target video may be generated in advance. If a user wants to watch a certain video, the terminal device may be triggered to output a video selection interface, as shown in FIG. 6E. Then, the user may select a desired target video from the video selection interface to play. Accordingly, the terminal device may perform S504 in response to a playback instruction for the target video, to realize video playback, as shown in FIG. 6F. In another example, in the embodiments of this disclosure, the playback instruction of the user for the target video may be first detected. When the playback instruction is detected, S501 to S504 are performed to realize video playback. In this case, the transcoded data of the target video may be generated in real time.

In the embodiments of this disclosure, during video playback, an image frame sequence corresponding to a target video may be obtained in advance, and a frame type of each frame in the image frame sequence is recognized. The frame type herein includes an effective frame, an overlapped frame, or a repeated frame. Frame types of frame images other than the first frame image and the last frame image in the image frame sequence are recognized by using the foregoing image recognition method, which can effectively improve the accuracy and stability of frame type recognition. Then, frame images of which frame types are the overlapped frame and the repeated frame may be filtered out from the image frame sequence, and frame insertion and transcoding is performed on the filtered image frame sequence. In this way, an effective frame rate (that is, a quantity of frame images played every second) of the target video can be effectively improved, and when the target video is played according to the transcoded data, ghosting or tearing caused by overlapped frames and stuttering caused by repeated frame images can be reduced, thereby improving the playback effect of the target video.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 7:
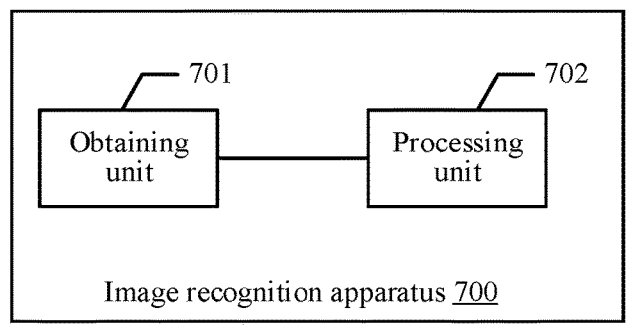
FIG. 7 is a schematic structural diagram of an image recognition apparatus according to an embodiment of this disclosure.

Based on the description of related embodiments of the foregoing image recognition method, an embodiment of this disclosure further provides an image recognition apparatus. The image recognition apparatus may be a computer program (including program code) running on a server. The image recognition apparatus may perform the method shown in FIG. 2 to FIG. 4D. Referring to FIG. 7, the image recognition apparatus may run the following units:

an obtaining unit 701, configured to obtain a first frame image of which a frame type is known, and a second frame image and a third frame image of which frame types are unknown from an image frame sequence; and a processing unit 702, configured to obtain a predicted pixel sequence of the second frame image through prediction according to the first frame image and the third frame image, the predicted pixel sequence including prediction values of pixels in the second frame image;

the processing unit 702 being further configured to calculate a pixel error according to a second pixel sequence and the predicted pixel sequence of the second frame image, the second pixel sequence including pixel values of the pixels in the second frame image; and the processing unit 702 being further configured to recognize a frame type of the second frame image or the third frame image according to the pixel error.

In an implementation, during the obtaining of the predicted pixel sequence of the second frame image through prediction according to the first frame image and the third frame image, the processing unit 702 may be specifically configured to: construct a first pixel sequence by using pixel values of pixels in the first frame image, and construct a third pixel sequence by using pixel values of pixels in the third frame image; obtain a first overlapping ratio between the second frame image and the first frame image and a second overlapping ratio between the second frame image and the third frame image; and perform weighted summation on the first pixel sequence and the third pixel sequence by using the first overlapping ratio and the second overlapping ratio, to obtain the predicted pixel sequence of the second frame image.

In yet another implementation, during the obtaining of the first overlapping ratio between the second frame image and the first frame image and the second overlapping ratio between the second frame image and the third frame image, the processing unit 702 may be specifically configured to: determine a first overlapping parameter between the second frame image and the first frame image and a second overlapping parameter between the second frame image and the third frame image; construct a fitting function by using the first overlapping parameter, the second overlapping parameter, the first pixel sequence, the second pixel sequence, and the third pixel sequence; and resolve the fitting function, to obtain a value of the first overlapping parameter and a value of the second overlapping parameter, the value of the first overlapping parameter being used for representing the first overlapping ratio between the second frame image and the first frame image, and the value of the second overlapping parameter being used for representing the second overlapping ratio between the second frame image and the third frame image.

In yet another implementation, during the resolving of the fitting function, to obtain the value of the first overlapping parameter and the value of the second overlapping parameter, the processing unit 702 may be specifically configured to: construct a first vector by using the first pixel sequence, construct a second vector by using the second pixel sequence, and construct a third vector by using the third pixel sequence; construct a vector matrix by using the first vector and the third vector, and obtain a square matrix corresponding to the vector matrix; and perform inverse operation on the square matrix, and obtain the value of the first overlapping parameter and the value of the second overlapping parameter through calculation according to the result of inverse operation and the second vector.

In yet another implementation, the frame type includes any one of the following: an effective frame, an overlapped frame, or a repeated frame, the effective frame being a non-repeated and non-overlapped frame in the image frame sequence. Accordingly, during the recognizing of the frame type of the second frame image or the third frame image according to the pixel error, the processing unit 702 may be specifically configured to: determine, when the pixel error meets an error condition, that the frame type of the second frame image is the effective frame; and determine, when the pixel error does not meet the error condition, the frame type of the second frame image or the third frame image according to the first overlapping ratio and the second overlapping ratio, the pixel error including at least one of the following: a mean squared error and a maximum error, and the error condition including at least one of the following: the mean squared error is greater than a first threshold and the maximum error is greater than a second threshold.

In yet another implementation, during the determining of the frame type of the second frame image or the third frame image according to the first overlapping ratio and the second overlapping ratio, the processing unit 702 may be specifically configured to: determine, when the first overlapping ratio and the second overlapping ratio meet a ratio condition, that the frame type of the second frame image is the effective frame; and determine, when the first overlapping ratio and the second overlapping ratio do not meet the ratio condition, that there is a frame image of which the frame type is the overlapped frame or the repeated frame in the second frame image and the third frame image, the ratio condition including at least one of the following: the first overlapping ratio is less than a third threshold, the second overlapping ratio is less than the third threshold, or an absolute value of a difference between an absolute value of a sum of the first overlapping ratio and the second overlapping ratio and a reference value is greater than a fourth threshold, In yet another implementation, after it is determined that there is a frame image of which the frame type is the overlapped frame or the repeated frame in the second frame image and the third frame image, the processing unit 702 may be further configured to: determine, when an absolute value of a difference between the first overlapping ratio and the reference value is less than a fifth threshold, that the frame type of the second frame image is the repeated frame; determine, when an absolute value of a difference between the second overlapping ratio and the reference value is less than the fifth threshold, that the frame type of the third frame image is the repeated frame; and determine, when both the absolute value of the difference between the first overlapping ratio and the reference value and the absolute value of the difference between the second overlapping ratio and the reference value are greater than or equal to the fifth threshold, that the frame type of the second frame image is the overlapped frame.

According to an embodiment of this disclosure, all the steps included in the method shown in FIG. 2 to FIG. 4D may be performed by using the units in the image recognition apparatus 700 shown in FIG. 7. For example, S201 shown in FIG. 2 may be performed by using the obtaining unit 701 shown in FIG. 7, and S202 to S204 may be performed by using the processing unit 702 shown in FIG. 7. In another example, S301 shown in FIG. 3 may be performed by using the obtaining unit 701 shown in FIG. 7, and S302 to S308 may be performed by using the processing unit 702 shown in FIG. 7. In yet another example, all steps shown in FIG. 4A to FIG. 4D may be performed by using the processing unit 702 shown in FIG. 7, and the like.

According to another embodiment of this disclosure, the units of the image recognition apparatus 700 shown in FIG. 7 may be separately or wholly combined into one or several other units, or one (or more) of the units herein may further be divided into a plurality of units of smaller functions. In this way, same operations can be implemented, and the implementation of the technical effects of the embodiments of this disclosure is not affected. The foregoing units are divided based on logical functions. In an actual application, a function of one unit may also be implemented by a plurality of units, or functions of a plurality of units are implemented by one unit. In other embodiments of this disclosure, the image recognition apparatus may also include other units. In an actual application, the functions may also be cooperatively implemented by other units and may be cooperatively implemented by a plurality of units.

According to another embodiment of this disclosure, a computer program (including program code) that can perform the steps in the corresponding method shown in FIG. 2 to FIG. 4D may be run on a general computing device, such as a computer, which includes processing elements and storage elements such as a central processing unit (CPU), a random access memory (RAM), and a read-only memory (ROM), to construct the image recognition apparatus 700 shown in FIG. 7 and implement the image recognition method in the embodiments of this disclosure. The computer program may be recorded on, for example, a computer-readable recording medium, and may be loaded into the foregoing computing device by using the computer-readable recording medium and run on the computing device.

A frame type of the first frame image in the embodiments of this disclosure is known, and the second frame image is located between the first frame image and the third frame image in the image frame sequence. During recognition of frame types of the second frame image and the third frame image, a predicted pixel sequence of the second frame image may be first obtained through prediction according to the first frame image and the third frame image. Pixel prediction is performed on the second frame image by using two image frames neighboring the second frame image, which can effectively improve the accuracy of the predicted pixel sequence. Next, a pixel error may be calculated according to an actual pixel sequence (a second pixel sequence) and the relatively accurate predicted pixel sequence of the second frame image, to effectively reduce an effect caused by coding noise, thereby improving the accuracy and stability of the pixel error. Then, a frame type of the second frame image or the third frame image may be recognized according to the relatively accurate pixel error, to improve the accuracy and stability of frame type recognition.

Figure 8:
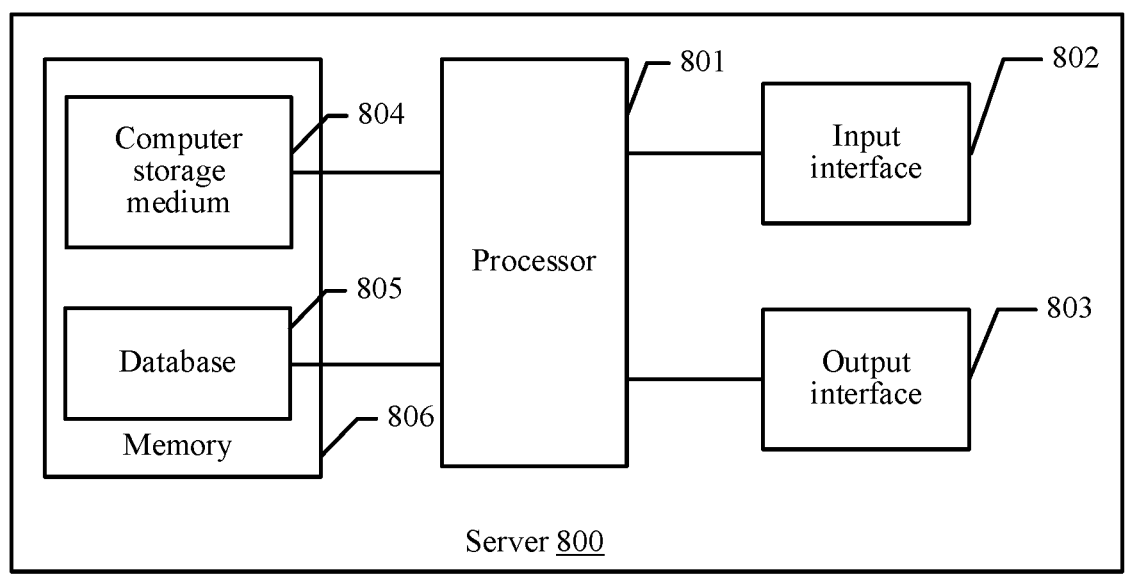
FIG. 8 is a schematic structural diagram of a server according to an embodiment of this disclosure.

Based on the description of the method embodiment and the apparatus embodiment of image recognition, an embodiment of this disclosure further provides a server. Referring to FIG. 8, the server 800 may include at least a processor 801, an input device 802, an output device 803, and a computer storage medium 804. The processor 801, the input device 802, the output device 803, and the computer storage medium 804 in the server may be connected by using a bus or in other manners.

The computer storage medium 804 may be stored in a memory 806 of the server 800. The computer storage medium 804 is configured to store a computer program. The computer program includes program instructions. The processor 801 is configured to execute the program instructions stored in the computer storage medium 804. The processor 801 (or referred to as a central processing unit (CPU)) is a computing core and a control core of the server, which is applicable to implementing one or more instructions, and is specifically applicable to loading and executing one or more instructions to implement the image recognition method provided in the foregoing embodiments.

This embodiment of this disclosure further provides a computer storage medium (memory). The computer storage medium is a memory device in the server and is configured to store a program and data. It may be understood that the computer storage medium herein may include an internal storage medium of the server, and certainly may also include an extended storage medium supported by the server. The computer storage medium provides a storage space, storing an operating system of the server. In addition, the storage space further stores one or more instructions suitable for being loaded and executed by the processor 801. The instructions may be one or more computer programs (including program code). The computer storage medium herein may be a high-speed RAM memory, or may be a non-volatile memory such as at least one magnetic disk storage. The computer storage medium may be at least one computer storage medium far away from the foregoing processor.

An embodiment of this disclosure further provides a storage medium, the storage medium being configured to store a computer program, the computer program being configured to perform the image recognition method according to the foregoing embodiments.

An embodiment of this disclosure further provides a computer program product including instructions, the instructions, when run on a computer, causing the computer to perform the image recognition method according to the foregoing embodiments.

A frame type of the first frame image in the embodiments of this disclosure is known, and the second frame image is located between the first frame image and the third frame image in the image frame sequence. During recognition of frame types of the second frame image and the third frame image, a predicted pixel sequence of the second frame image may be first obtained through prediction according to the first frame image and the third frame image. Pixel prediction is performed on the second frame image by using two image frames neighboring the second frame image, which can effectively improve the accuracy of the predicted pixel sequence. Next, a pixel error may be calculated according to an actual pixel sequence (a second pixel sequence) and the relatively accurate predicted pixel sequence of the second frame image, to effectively reduce an effect caused by coding noise, thereby improving the accuracy and stability of the pixel error. Then, a frame type of the second frame image or the third frame image may be recognized according to the relatively accurate pixel error, to improve the accuracy and stability of frame type recognition.

Figure 9:
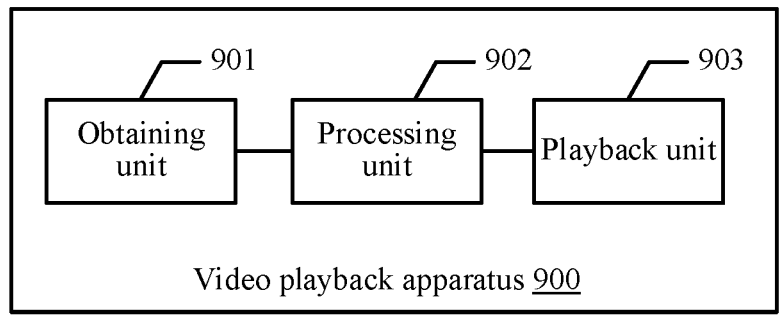
FIG. 9 is a schematic structural diagram of a video playback apparatus according to an embodiment of this disclosure.

Based on the description of the related embodiments of the foregoing video playback method, an embodiment of this disclosure further provides a video playback apparatus. The video playback apparatus may perform the method shown in FIG. 5 to FIG. 6B. Referring to FIG. 9, the video playback apparatus may run the following units:

an obtaining unit 901, configured to obtain an image frame sequence corresponding to a target video, the image frame sequence including a plurality of image frames;

a processing unit 902, configured to recognize a frame type of each frame image in the image frame sequence, frame types of frame images other than the first frame image and the last frame image in the image frame sequence being obtained through recognition by using the foregoing image recognition method, the frame type including any one of the following: an effective frame, an overlapped frame, or a repeated frame, the effective frame being a non-repeated and non-overlapped frame in the image frame sequence;

the processing unit 902 being further configured to filter out frame images of which frame types are the overlapped frame and the repeated frame from the image frame sequence, and perform frame insertion and transcoding on the filtered image frame sequence, to obtain transcoded data; and a playback unit 903, configured to play back the target video according to the transcoded data in a playback interface of a client.

According to an embodiment of this disclosure, all the steps included in the method shown in FIG. 5 to FIG. 6A may be performed by using the units in the video playback apparatus 900 shown in FIG. 9. For example, S501 shown in FIG. 5 may be performed by using the obtaining unit 901 shown in FIGS. 9, S502 and S503 may be performed by using the processing unit 902 shown in FIG. 9, and S504 may be performed by using the playback unit 903 shown in FIG. 9. In another example, all steps shown in FIG. 6A and FIG. B may be performed by using the processing unit 902 shown in FIG. 9, and the like.

According to another embodiment of this disclosure, units in the video playback apparatus 900 shown in FIG. 9 may be separately or wholly combined into one or several other units, or one (or more) of the units herein may further be divided into multiple units of smaller functions. In this way, same operations can be implemented, and implementation of the technical effects of the embodiments of this disclosure is not affected. The foregoing units are divided based on logical functions. In an actual application, a function of one unit may also be implemented by a plurality of units, or functions of a plurality of units are implemented by one unit. In other embodiments of this disclosure, the video playback apparatus may also include other units. During actual application, the functions may also be cooperatively implemented by other units and may be cooperatively implemented by a plurality of units.

According to another embodiment of this disclosure, a computer program (including program code) that can perform the steps in the corresponding method shown in FIG. 5 to FIG. 6B may be run on a general computing device, such as a computer, which includes processing elements and storage elements such as a central processing unit (CPU), a random access memory (RAM), and a read-only memory (ROM), to construct the video playback apparatus 900 shown in FIG. 9 and implement the video playback method in the embodiments of this disclosure. The computer program may be recorded on, for example, a computer-readable recording medium, and may be loaded into the foregoing computing device by using the computer-readable recording medium and run on the computing device.

In the embodiments of this disclosure, during video playback, an image frame sequence corresponding to a target video may be obtained in advance, and a frame type of each frame in the image frame sequence is recognized. The frame type herein includes an effective frame, an overlapped frame, or a repeated frame. Frame types of frame images other than the first frame image and the last frame image in the image frame sequence are recognized by using the foregoing image recognition method, which can effectively improve the accuracy and stability of frame type recognition. Then, frame images of which frame types are the overlapped frame and the repeated frame may be filtered out from the image frame sequence, and frame insertion and transcoding is performed on the filtered image frame sequence. In this way, an effective frame rate (that is, a quantity of frame images played every second) of the target video can be effectively improved, and when the target video is played according to the transcoded data, ghosting or tearing caused by overlapped frames and stuttering caused by repeated frame images can be reduced, thereby improving the playback effect of the target video.

Figure 10:
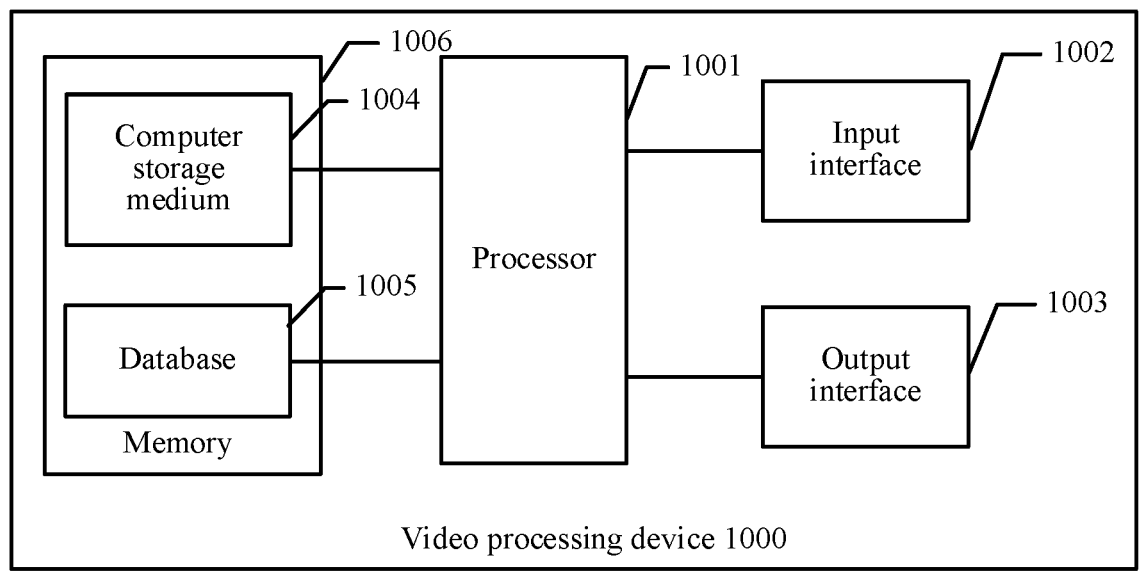
FIG. 10 is a schematic structural diagram of a video processing device according to an embodiment of this disclosure.

Based on the description of the method embodiment and the apparatus embodiment of video playback, an embodiment of this disclosure further provides a video processing device. The video processing device herein may be the server or the terminal device in the foregoing video processing system. Referring to FIG. 10, the video processing device 1000 may include at least a processor 1001, an input device 1002, an output device 1003, and a computer storage medium 1004. The processor 1001, the input device 1002, the output device 1003, and the computer storage medium 1004 in the video processing device 1000 may be connected by using a bus or in other manners.

The computer storage medium 1004 may be stored in a memory 1006 of the video processing device 1000. The computer storage medium 1004 is configured to store a computer program. The computer program includes program instructions. The processor 1001 is configured to execute the program instructions stored in the computer storage medium 1004. The processor 1001 (or referred to as a CPU) is a computing core and a control core of the video processing device, which is applicable to implementing one or more instructions, and is specifically applicable to loading and executing one or more instructions to implement the image recognition method provided in the foregoing embodiments.

An embodiment of this disclosure further provides a computer storage medium, and the computer storage medium being a memory device in the video processing device and being configured to store programs and data. It may be understood that the computer storage medium herein may include an internal storage medium of the video processing device and certainly may also include an extended storage medium supported by the video processing device. The computer storage medium provides storage space, and the storage space stores an operating system of the video processing device. In addition, the storage space further stores one or more instructions suitable for being loaded and executed by the processor 1001. The instructions may be one or more computer programs (including program code). The computer storage medium herein may be a high-speed RAM memory, or may be a non-volatile memory such as at least one magnetic disk storage. Optionally, the computer storage medium may be at least one computer storage medium far away from the foregoing processor.

An embodiment of this disclosure further provides a storage medium, the storage medium being configured to store a computer program, the computer program being configured to perform the video playback method according to the foregoing embodiments.

An embodiment of this disclosure further provides a computer program product including instructions, the instructions, when run on a computer, causing the computer to perform the video playback method according to the foregoing embodiments.

In the embodiments of this disclosure, during video playback, an image frame sequence corresponding to a target video may be obtained in advance, and a frame type of each frame in the image frame sequence is recognized. The frame type herein includes an effective frame, an overlapped frame, or a repeated frame. Frame types of frame images other than the first frame image and the last frame image in the image frame sequence are recognized by using the foregoing image recognition method, which can effectively improve the accuracy and stability of frame type recognition. Then, frame images of which frame types are the overlapped frame and the repeated frame may be filtered out from the image frame sequence, and frame insertion and transcoding is performed on the filtered image frame sequence. In this way, an effective frame rate (that is, a quantity of frame images played every second) of the target video can be effectively improved, and when the target video is played according to the transcoded data, ghosting or tearing caused by overlapped frames and stuttering caused by repeated frame images can be reduced, thereby improving the playback effect of the target video.

What are disclosed above are merely examples of embodiments of this disclosure, and certainly are not intended to limit the protection scope of this disclosure. Therefore, equivalent variations made in accordance with the claims of this disclosure shall fall within the scope of this disclosure.

What is claimed is:

1. An image recognition method, performed by a server, the method comprising:
  obtaining a first frame image of which a frame type is known, and a second frame image and a third frame image of which frame types are unknown from an image frame sequence,
    the second frame image being located between the first frame image and the third frame image in the image frame sequence,
    the frame type comprising at least one of an effective frame, an overlapped frame, or a repeated frame,
      the effective frame being a non-repeated and non-overlapped frame in the image frame sequence,
      the repeated frame is a frame with an identical image with a previous frame in the image frame sequence, and
      the overlapped frame is a frame obtained by respectively multiplying pixel values of respective adjacent image frames by weight coefficients of the respective adjacent image frames and add the multiplied pixel values of the respective adjacent image frames together;
  constructing a first pixel sequence using pixel values of pixels in the first frame image, and constructing a third pixel sequence using pixel values of pixels in the third frame image;
  obtaining a first image overlapping ratio between the second frame image and the first frame image and a second image overlapping ratio between the second frame image and the third frame image; and
  performing weighted sum on the first pixel sequence and the third pixel sequence using the first image overlapping ratio and the second image overlapping ratio, to obtain predicted pixel sequence of the second frame image, the predicted pixel sequence comprising prediction values of pixels in the second frame image;
  calculating a pixel error according to a second pixel sequence of the second frame image and the predicted pixel sequence, the second pixel sequence comprising pixel values of the pixels in the second frame image, the pixel error indicating a difference between the second pixel sequence and the predicted pixel sequence;
  determining, in response to the pixel error meeting an error condition, that the frame type of the second frame image is the effective frame; and
  determining, in response to the pixel error failing to meet the error condition, the frame type of the second frame image or the third frame image according to the first image overlapping ratio and the second image overlapping ratio.

2. The method according to claim 1, wherein the obtaining the first image overlapping ratio between the second frame image and the first frame image and the second image overlapping ratio between the second frame image and the third frame image comprises:
  constructing a fitting function using a first overlapping parameter, a second overlapping parameter, the first pixel sequence, the second pixel sequence, and the third pixel sequence, the fitting function being represented by:

$ax+by=z,$ wherein a indicates the first overlapping parameter, b indicates the second overlapping parameter, x indicates the first pixel sequence, y indicates the third pixel sequence, and z indicates the second pixel sequence; and
  resolving the fitting function, to obtain a value of the first overlapping parameter and a value of the second overlapping parameter,
    the value of the first overlapping parameter indicating the first image overlapping ratio, and
    the value of the second overlapping parameter indicating the second image overlapping ratio.

3. The method according to claim 2, wherein the resolving the fitting function comprises:
  constructing a first vector using the first pixel sequence, constructing a second vector using the second pixel sequence, and constructing a third vector using the third pixel sequence;
  constructing a matrix comprising the first vector and the third vector, and obtaining a square matrix corresponding to the matrix; and
  performing matrix inverse operation on the square matrix, and calculating the value of the first overlapping parameter and the value of the second overlapping parameter according to a result of the inverse operation and the second vector.

4. The method according to claim 3, wherein the constructing the first vector using the first pixel sequence, constructing the second vector using the second pixel sequence, and constructing the third vector using the third pixel sequence comprises:
  in response to a quantity of pixels of frame images in the image frame sequence being greater than a preset quantity, extracting pixel values of the preset quantity from the first pixel sequence and constructing the first vector using the extracted pixel values from the first pixel sequence, extracting pixel values of the preset quantity from the second pixel sequence and constructing the second vector using the extracted pixel values from the second pixel sequence, and extracting pixel values of the preset quantity from the third pixel sequence and constructing the third vector using the extracted pixel values from the third pixel sequence; and in response to the quantity of the pixels of the frame images in the image frame sequence being less than or equal to the preset quantity, using a vector corresponding to the first pixel sequence as the first vector, using a vector corresponding to the second pixel sequence as the second vector, and using a vector corresponding to the third pixel sequence as the third vector.

5. The method according to claim 3, wherein the performing inverse operation on the square matrix comprises:

performing a matrix full rank processing on the square matrix to obtain a full-rank square matrix by:

performing matrix scalar multiplication on an identity matrix, the identity matrix representing a matrix in which elements on a diagonal from a upper left corner to the lower right corner are all 1 and the other elements are all 0;

performing matrix addition operation on the scaled identity matrix and the square matrix; and performing matrix inverse operation on the full-rank square matrix.

6. The method according to claim 3, wherein the obtaining the square matrix corresponding to the matrix comprises:

partitioning the matrix into a plurality of sub-matrices;

obtaining sub-square matrices corresponding to the plurality of sub-matrices; and performing matrix addition operation on the sub-square matrices.

7. The method according to claim 6, wherein the obtaining the sub-square matrices comprises:

perform matrix transpose operation on each of the plurality of sub-matrices in parallel, to obtain transposed sub-matrices and for each of the plurality of sub-matrices, performing multiplication operation on the sub-matrix and the transposed sub-matrix of the sub-matrix in parallel, to obtain the sub-square matrices.

8. The method according to claim 6, wherein the obtaining the sub-square matrices corresponding to the plurality of sub matrices comprises:

perform matrix transpose operation on each of the plurality of sub-matrices sequentially, to obtain transposed sub-matrices; and performing multiplication operation on the each sub-matrix and the transposed sub-matrix of the each sub-matrix sequentially, to obtain the sub-square matrices.

9. The method according to claim 1, wherein the pixel error comprising a mean squared error or a maximum error, and the error condition comprising the mean squared error being greater than a first threshold or the maximum error being greater than a second threshold, the mean squared error being a pixel error calculated according to a square of a difference between a pixel value and a prediction value of each pixel in the second frame image, and the maximum error being a pixel error calculated according to an absolute value of a difference between a pixel value and a prediction value of a target pixel in the second frame image, the target pixel being a pixel having a maximum absolute value of a difference between a pixel value and a prediction value in the second frame image.

10. The method according to claim 9, the determining the frame type of the second frame image or the third frame image according to the first image overlapping ratio and the second image overlapping ratio comprises:

determining, in response to the first image overlapping ratio and the second image overlapping ratio meeting a ratio condition, that the frame type of the second frame image is the effective frame; and determining, in response to the first image overlapping ratio and the second image overlapping ratio failing to meet the ratio condition, that there is a frame image of which the frame type is the overlapped frame or the repeated frame in the second frame image and the third frame image, the ratio condition comprising at least one of:

the first image overlapping ratio being less than a third threshold, the second image overlapping ratio being less than the third threshold, or an absolute value of a difference between an absolute value of a sum of the first image overlapping ratio and the second image overlapping ratio and a reference value being greater than a fourth threshold, the third threshold being a negative number, and the fourth threshold being a positive number.

11. The method according to claim 10, wherein after the determining that there is a frame image of which the frame type is the overlapped frame or the repeated frame in the second frame image and the third frame image, the method further comprises:

determining, in response to an absolute value of a difference between the first image overlapping ratio and the reference value being less than a fifth threshold, that the frame type of the second frame image is the repeated frame;

determining, in response to an absolute value of a difference between the second image overlapping ratio and the reference value being less than the fifth threshold, that the frame type of the third frame image is the repeated frame; and determining, in response to both the absolute value of the difference between the first image overlapping ratio and the reference value and the absolute value of the difference between the second image overlapping ratio and the reference value being greater than or equal to the fifth threshold, that the frame type of the second frame image is the overlapped frame.

12. The method according to claim 1, the method further comprises:

obtaining a time attribute of the first frame image and a time attribute of the second frame image;

calculating an interval between the first frame image and the second frame image according to the time attribute of the first frame image and the time attribute of the second frame image;

predicting, in response to the interval being less than a duration threshold, a pixel sequence of the second frame image according to the first frame image and the third frame image; and determining, in response to the interval being greater than or equal to the duration threshold, that the frame type of the second frame image is an effective frame.

13. The method according to claim 1, wherein the first frame image, the second frame image, and the third frame image are cached in a data structure; the frame type comprises at least one of an effective frame, an overlapped frame, or a repeated frame, the effective frame being a non-repeated and non-overlapped frame in the image frame sequence; and the method further comprises:

removing the first frame image from the data structure in response to the frame type of the second frame image being the effective frame, and transcoding and storing the first frame image;

removing the second frame image from the data structure in response to the frame type of the second frame image being the overlapped frame or the repeated frame, and destroying the second frame image; and removing the third frame image from the data structure in response to the frame type of the third frame image being the repeated frame, and destroying the third frame image.

14. A video playback method, performed by a video processing device, the method comprising:

obtaining an image frame sequence corresponding to a target video, the image frame sequence comprising a plurality of image frames;

recognizing a frame type of each frame image in the image frame sequence, frame types of frame images other than the first frame image and the last frame image in the image frame sequence being recognized using the image recognition method according to claim 1, filtering out frame images of which frame types are the overlapped frame and the repeated frame from the image frame sequence;

generating a new frame image based on the filtered image frame sequence;

inserting the new frame image into the filtered image frame sequence;

transcoding the filtered image frame sequence to obtain transcoded data; and playing back the target video according to the transcoded data in a playback interface.

15. An image recognition apparatus, comprising:

a memory operable to store computer-readable instructions; and a processor circuitry operable to read the computer-readable instructions, the processor circuitry when executing the computer-readable instructions is configured to:

obtain a first frame image of which a frame type is known, and a second frame image and a third frame image of which frame types are unknown from an image frame sequence, the second frame image being located between the first frame image and the third frame image in the image frame sequence, the frame type comprising at least one of an effective frame, an overlapped frame, or a repeated frame, the effective frame being a non-repeated and non-overlapped frame in the image frame sequence, the repeated frame is a frame with an identical image with a previous frame in the image frame sequence, and the overlapped frame is a frame obtained by respectively multiplying pixel values of respective adjacent image frames by weight coefficients of the respective adjacent image frames and add the multiplied pixel values of the respective adjacent image frames together;

construct a first pixel sequence using pixel values of pixels in the first frame image, and construct a third pixel sequence using pixel values of pixels in the third frame image;

obtain a first image overlapping ratio between the second frame image and the first frame image and a second image overlapping ratio between the second frame image and the third frame image; and perform weighted sum on the first pixel sequence and the third pixel sequence using the first image overlapping ratio and the second image overlapping ratio, to obtain predicted pixel sequence of the second frame image, the predicted pixel sequence comprising prediction values of pixels in the second frame image;

calculate a pixel error according to a second pixel sequence of the second frame image and the predicted pixel sequence, the second pixel sequence comprising pixel values of the pixels in the second frame image, the pixel error indicating a difference between the second pixel sequence and the predicted pixel sequence; and determine, in response to the pixel error meeting an error condition, that the frame type of the second frame image is the effective frame; and determine, in response to the pixel error failing to meet the error condition, the frame type of the second frame image or the third frame image according to the first image overlapping ratio and the second image overlapping ratio.

16. The apparatus according to claim 15, wherein the processor circuitry is configured to:

construct a fitting function using a first overlapping parameter, a second overlapping parameter, the first pixel sequence, the second pixel sequence, and the third pixel sequence, the fitting function being represented by:

$$ax+by=z,$$

wherein a indicates the first overlapping parameter, b indicates the second overlapping parameter, x indicates the first pixel sequence, y indicates the third pixel sequence, and z indicates the second pixel sequence; and resolve the fitting function, to obtain a value of the first overlapping parameter and a value of the second overlapping parameter, the value of the first overlapping parameter indicating the first image overlapping ratio, and the value of the second overlapping parameter indicating the second image overlapping ratio.

17. The apparatus according to claim 15, wherein the pixel error comprising a mean squared error or a maximum error, and the error condition comprising the mean squared error being greater than a first threshold or the maximum error being greater than a second threshold, the mean squared error being a pixel error calculated according to a square of a difference between a pixel value and a prediction value of each pixel in the second frame image, and the maximum error being a pixel error calculated according to an absolute value of a difference between a pixel value and a prediction value of a target pixel in the second frame image, the target pixel being a pixel having a maximum absolute value of a difference between a pixel value and a prediction value in the second frame image.

18. The apparatus according to claim 15, the processor circuitry is further configured to:

obtain a time attribute of the first frame image and a time attribute of the second frame image;

calculate an interval between the first frame image and the second frame image according to the time attribute of the first frame image and the time attribute of the second frame image;

predict, in response to the interval being less than a duration threshold, a pixel sequence of the second frame image according to the first frame image and the third frame image; and determine, in response to the interval being greater than or equal to the duration threshold, that the frame type of the second frame image is an effective frame.

\* \* \* \* \*